US011539960B2

(12) United States Patent
Cerny et al.

(10) Patent No.: US 11,539,960 B2
(45) Date of Patent: Dec. 27, 2022

(54) GAME APPLICATION PROVIDING SCENE CHANGE HINT FOR ENCODING AT A CLOUD GAMING SERVER

(71) Applicant: Sony Interactive Entertainment Inc., Tokyo (JP)

(72) Inventors: Mark E. Cerny, Los Angeles, CA (US); Kelvin M. Yong, Irvine, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/037,425

(22) Filed: Sep. 29, 2020

(65) Prior Publication Data

US 2021/0099713 A1    Apr. 1, 2021

Related U.S. Application Data

(60) Provisional application No. 62/909,158, filed on Oct. 1, 2019.

(51) Int. Cl.
*H04N 19/142* (2014.01)
*A63F 13/352* (2014.01)
(Continued)

(52) U.S. Cl.
CPC ......... *H04N 19/142* (2014.11); *A63F 13/352* (2014.09); *H04N 19/177* (2014.11); *H04N 19/179* (2014.11)

(58) Field of Classification Search
CPC ....... H04L 51/046; H04L 67/22; H04L 67/18; G06F 16/907; G06F 16/9537;
(Continued)

(56) References Cited

U.S. PATENT DOCUMENTS 5,754,233 A  *  5/1998  Takashima ............. H04N 19/87
                                                         348/390.1
7,478,256 B2     1/2009  Conway et al.
(Continued)

OTHER PUBLICATIONS

Hong Hua-Jun et al: "Enabling Adaptive Cloud Gaming in an Open-Source Cloud Gaming Platform", IEEE Transactions on Circuits and Systems for Video Technology, Institute of Electrical and Electronics Engineers, US, vol. 25, No. 12, Dec. 1, 2015 (Dec. 1, 2015), pp. 2078-2091, XP011593989, ISSN: 1051-8215, DOI:10.1109/TCSVT.2015.2450173 [Retrieved on Dec. 2, 2015] p. 2079, right col., 2. para. (i.e., bottom para. of Sec. I).

(Continued)

*Primary Examiner* — Christopher S Kelley
*Assistant Examiner* — Ana Picon-Feliciano
(74) *Attorney, Agent, or Firm* — Penilla IP, APC

(57) ABSTRACT

A method for encoding including executing game logic built on a game engine of a video game at a cloud gaming server to generate video frames. The method including executing scene change logic to predict a scene change in the video frames based on game state collected during execution of the game logic. The method including identifying a range of video frames that is predicted to include the scene change. The method including generating a scene change hint using the scene change logic, wherein the scene change hint identifies the range of video frames, wherein the range of video frames includes a first video frame. The method including delivering the first video frame to an encoder. The method including sending the scene change hint from the scene change logic to the encoder. The method including encoding the first video frame as an I-frame based on the scene change hint.

23 Claims, 11 Drawing Sheets

(51) Int. Cl.
*H04N 19/177* (2014.01)
*H04N 19/179* (2014.01)

(58) Field of Classification Search
CPC . G06Q 30/0252; A63F 13/352; A63F 13/355; H04N 19/107; H04N 19/114; H04N 19/142; H04N 19/177; H04N 19/179
USPC .................................................. 375/240.12
See application file for complete search history.

(56) References Cited

U.S. PATENT DOCUMENTS

| | | | |
|---|---|---|---|
| 8,223,845 B1 | 7/2012 | Duvivier | |
| 8,613,673 B2 | 12/2013 | Perry et al. | |
| 8,923,372 B2 | 12/2014 | Yang et al. | |
| 9,691,181 B2 | 6/2017 | Watson et al. | |
| 9,968,847 B2 | 5/2018 | Perlman et al. | |
| 10,075,750 B2 | 9/2018 | Gordon et al. | |
| 10,629,222 B2 | 4/2020 | Takeshima et al. | |
| 10,675,544 B2 | 6/2020 | Stroud | |
| 11,120,293 B1 * | 9/2021 | Rosenzweig | H04N 19/142 |
| 2002/0126130 A1 | 9/2002 | Yourlo | |
| 2002/0136335 A1 | 9/2002 | Liou et al. | |
| 2005/0259754 A1 | 11/2005 | Ho et al. | |
| 2007/0174647 A1 | 7/2007 | Conway et al. | |
| 2010/0166064 A1 | 7/2010 | Perlman et al. | |
| 2010/0316066 A1 | 12/2010 | Leung | |
| 2011/0276648 A1 | 11/2011 | Soldan | |
| 2011/0276710 A1 | 11/2011 | Mighani et al. | |
| 2012/0108331 A1 | 5/2012 | Dietrich, Jr. et al. | |
| 2013/0039408 A1 | 2/2013 | Cohen et al. | |
| 2013/0091251 A1 | 4/2013 | Walker et al. | |
| 2013/0132510 A1 | 5/2013 | Ye et al. | |
| 2013/0237316 A1 | 9/2013 | Cotter | |
| 2014/0086310 A1 | 3/2014 | Tanner et al. | |
| 2014/0087873 A1 | 3/2014 | Steil | |
| 2014/0187331 A1 | 7/2014 | Kim et al. | |
| 2014/0247885 A1 | 9/2014 | Brueck et al. | |
| 2014/0289627 A1 | 9/2014 | Brockmann et al. | |
| 2014/0307168 A1 | 10/2014 | Law et al. | |
| 2015/0181084 A1 | 6/2015 | Colenbrander | |
| 2015/0195531 A1 | 7/2015 | Maegawa et al. | |
| 2015/0253954 A1 | 9/2015 | Steil | |
| 2015/0264298 A1 | 9/2015 | Colenbrander | |
| 2015/0273330 A1 | 10/2015 | Saito | |
| 2015/0296215 A1 | 10/2015 | Callahan | |
| 2016/0001177 A1 | 1/2016 | Tsushima et al. | |
| 2016/0059125 A1 | 3/2016 | Georgiev et al. | |
| 2016/0127614 A1 | 5/2016 | Molnar | |
| 2016/0303479 A1 | 10/2016 | Cotter | |
| 2016/0366431 A1 | 12/2016 | Kazui | |
| 2017/0087464 A1 | 3/2017 | Perry et al. | |
| 2017/0293459 A1 | 10/2017 | Watson et al. | |
| 2018/0027041 A1 | 1/2018 | Yuen et al. | |
| 2018/0035019 A1 | 2/2018 | Back et al. | |
| 2018/0077429 A1 | 3/2018 | Lee et al. | |
| 2018/0115743 A1 | 4/2018 | McLoughlin et al. | |
| 2018/0268512 A1 | 9/2018 | Pronovost et al. | |
| 2018/0280802 A1 | 10/2018 | Stroud | |
| 2018/0295367 A1 * | 10/2018 | Mohammed | H04N 21/44209 |
| 2019/0217191 A1 | 7/2019 | Colenbrander | |
| 2019/0224577 A1 | 7/2019 | van der Laan et al. | |
| 2020/0004408 A1 | 1/2020 | Brockmann et al. | |
| 2020/0206614 A1 | 7/2020 | Colenbrander | |
| 2020/0206619 A1 | 7/2020 | van der Laan et al. | |
| 2020/0298125 A1 | 9/2020 | Stroud | |

OTHER PUBLICATIONS

Paravati G et al: "A feedback-based control technique for interactive live streaming systems to mobile devices", IEEE Transactions on Consumer Electronics, IEEE Service Center, New York, NY, US, vol. 53, No. 1, Feb. 1, 2010 (Feb. 1, 2010), pp. 190-197, XP013306131, ISSN: 0098-3063 p. 192, right col.
ISR & Written Opinion, PCT/US2020/053347, dated Dec. 3, 2020, 17 pages.
Invitation to Pay Addl Fees, Partial Intl Search, PCT/US2020/053348, dated Dec. 3, 2020, 11pages.
Invitation to Pay Addl Fees, Partial Inti Search PCT/US2020/053657, dated Jan. 12, 2021, 16 pages.
Invitation to Pay Addl Fees, Partial Intl Search PCT/US2020/053343, dated Jan. 28, 2021, 24 pages.
ISR & Written Opinion, PCT/US2020/053348, dated Feb. 2, 2020, 16 pages.
ISR & Written Opinion, PCT/US2020/053657, dated Mar. 5, 2021, 19 pages.
Intl Search Report and Written Opinion PCT/US2020/053554, dated Dec. 21, 2020, 14 pages.
ISR & Written Opinion, PCT/US2020/053343, dated May 20, 2021, 35 pages.

* cited by examiner

GAME APPLICATION PROVIDING SCENE CHANGE HINT FOR ENCODING AT A CLOUD GAMING SERVER

CLAIM OF PRIORITY

This application claims priority to and the benefit of U.S. Provisional App. Ser. No. 62/909,158 filed on Oct. 1, 2019, entitled "GAME APPLICATION PROVIDING SCENE CHANGE HINT FOR ENCODING AT A CLOUD GAMING SERVER," the disclosure of which is incorporated herein by reference in its entirety for all purposes.

TECHNICAL FIELD

The present disclosure is related to streaming systems configured for streaming content across a network, and more specifically to providing to an encoder a scene change hint for a video frame generated during execution of a video game for purposes of reducing latency between the cloud gaming server and a client, for providing consistent latency between the cloud gaming server and client, and for improving smoothness of client display of video.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to network between players for multi-player gaming, sharing of assets between players, sharing of instant experiences between players and/or spectators, allowing friends to watch a friend play a video game, having a friend join the on-going game play of a friend, and the like. Unfortunately, the demand is also pushing up against limits of the capabilities of network connections and the processing performed at the server and the client that is responsive enough to render high quality images as delivered to the client. For example, results of all gaming activities that are performed on the server need to be compressed and transmitted back to the client at low millisecond latency for the best user experience. Round-trip latency may be defined as the overall time between the user's controller input and the display of the video frames at the client; it may include processing and transmission of the control information from controller to client, processing and transmission of the control information from client to server, usage of that input at the server to generate a video frame responsive to the input, processing and transfer of the video frame to the encoding unit (e.g. scan-out), encode of the video frame, transmission of the encoded video frame back to the client, reception and decoding of the video frame, and any processing or staging of the video frame prior to its display. One-way latency may be defined as being the part of the round-trip latency consisting of the time from beginning of transfer of the video frame to the encoding unit (e.g. scan-out) at the server to the beginning of display of video frame at the client. A portion of the round-trip and one-way latency is associated with time taken for the data streams to be sent from client to server and server to client over a communications network. Another portion is associated with processing at client and server; improvements in these operations, such as advanced strategies related to frame decoding and display, can result in substantially reduced round-trip and one-way latency between the server and the client and provide a higher quality experience to users of cloud gaming services.

It is in this context that embodiments of the disclosure arise.

SUMMARY

Embodiments of the present disclosure relate to streaming systems configured for streaming content (e.g., gaming) across a network, and more specifically to providing to an encoder a scene change hint for a video frame generated during execution of a video game for purposes of reducing latency and providing more consistent latency between the cloud gaming server and a client, and for improving smoothness of client display of video.

Embodiments of the present disclosure disclose a method for encoding. The method including executing game logic built on a game engine of a video game at a cloud gaming server to generate a plurality of video frames. The method including executing a scene change logic to predict a scene change in the plurality of video frames, wherein the prediction is based on game state collected during execution of the game logic. The method including identifying a range of video frames in the plurality of video frames that is predicted to include the scene change. The method including generating a scene change hint using the scene change logic, wherein the scene change hint identifies the range of video frames, wherein the range of video frames includes a first video frame. The method including delivering the first video frame to an encoder. The method including sending the scene change hint from the scene change logic to the encoder. The method including encoding the first video frame as an I-frame based on the scene change hint.

In another embodiment, a non-transitory computer-readable medium storing a computer program for encoding is disclosed. The computer-readable medium including program instructions for executing game logic built on a game engine of a video game at a cloud gaming server to generate a plurality of video frames. The computer-readable medium including program instructions for executing a scene change logic to predict a scene change in the plurality of video frames, wherein the prediction is based on game state collected during execution of the game logic. The computer-readable medium including program instructions for identifying a range of video frames in the plurality of video frames that is predicted to include the scene change. The computer-readable medium including program instructions for generating a scene change hint using the scene change logic, wherein the scene change hint identifies the range of video frames, wherein the range of video frames includes a first video frame. The computer-readable medium including program instructions for delivering the first video frame to an encoder. The computer-readable medium including program instructions for sending the scene change hint from the scene change logic to the encoder. The computer-readable medium including program instructions for encoding the first video frame as an I-frame based on the scene change hint.

In still another embodiment, a computer system includes a processor, and memory coupled to the processor and having stored therein instructions that, if executed by the computer system, cause the computer system to execute a method for encoding. The method including executing game logic built on a game engine of a video game at a cloud gaming server to generate a plurality of video frames. The method including executing a scene change logic to predict a scene change in the plurality of video frames, wherein the prediction is based on game state collected during execution of the game logic. The method including identifying a range of video frames in the plurality of video frames that is predicted to include the scene change. The method including generating a scene change hint using the scene change logic, wherein the scene change hint identifies the range of video frames, wherein the range of video frames includes a first video frame. The method including delivering the first video frame to an encoder. The method including sending the scene change hint from the scene change logic to the encoder. The method including encoding the first video frame as an I-frame based on the scene change hint.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
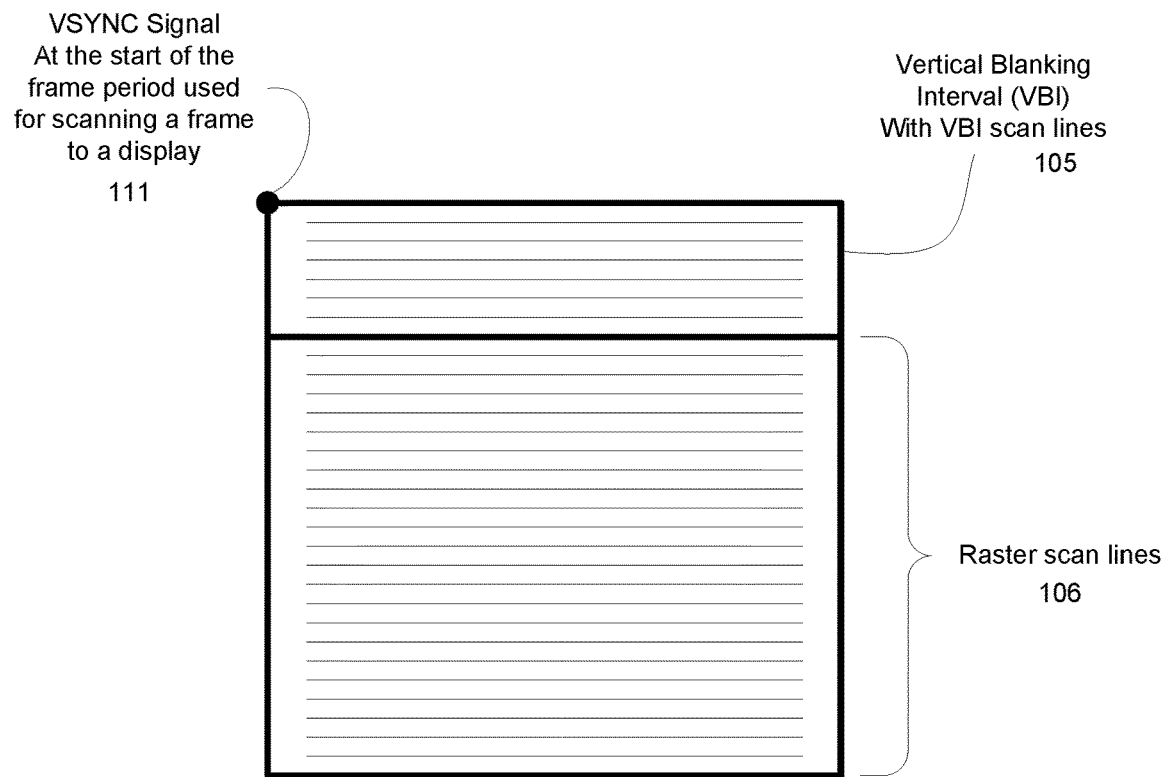
FIG. 1A is a diagram of a VSYNC signal at the beginning of a frame period, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe methods and systems configured to reduce latency and/or latency instability between source and target devices when streaming media content (e.g., streaming audio and video from video games). Latency instability may be introduced in the one-way latency between a server and client due to the additional time needed to generate a complex frame (e.g., scene change) at the server, increased times to encode/compress the complex frame at the server, variable communication paths over a network, and increased time to decode complex frames at the client. Latency instability may also be introduced due to differences in clocks at the server and the client, which causes a drift between server and client VSYNC signals. In embodiments of the present disclosure, one-way latency between the server and client can be reduced in cloud gaming applications by providing to an encoder a scene change hint for a video frame generated during execution of a video game. The encoder may perform different encoding (e.g. switch to an I-frame rather than encoding with a P-frame in an MPEG compression format used for streaming content between a cloud gaming server and client) on a video frame that is a scene change. In particular, when the game application informs the encoder that a scene change has occurred (e.g., via an API, such as a GPU API), this scene change hint can be used in the encoding process. In that manner, because a scene change hint is provided to the encoder, the encoder does not need to detect for a scene change, which may introduce jitter and increased latency for scene change detection and re-encoding of the video frame with more complexity. That is, the encoder can immediately encode using the proper complexity (e.g., I-frame) the video frame that is identified as a scene change using a scene change hint without requiring one or more additional frame periods for scene change detection and re-encoding of the video frame with more complexity. This leads to a reduction in one-way latency, smoother frame rates, and more reliable and/or consistent one-way latency between the cloud gaming server and the client.

With the above general understanding of the various embodiments, example details of the embodiments will now be described with reference to the various drawings.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

Cloud gaming includes the execution of a video game at the server to generate game rendered video frames, which are then sent to a client for display. Timing of operations at both the server and the client may be tied to respective vertical synchronization (VSYNC) parameters. When VSYNC signals are properly synchronized and/or offset between the server and/or the client, the operations performed at the server (e.g., generation and transmission of video frames over one or more frame periods) are synchronized with the operations performed at the client (e.g., displaying the video frames on a display at a display frame or refresh rate corresponding to the frame period). In particular, a server VSYNC signal generated at the server and a client VSYNC signal generated at the client may be used for synchronizing operations at the server and client. That is, when server and client VSYNC signals are synchronized and/or offset, the server generates and sends video frames in synchronization with how the client displays those video frames.

VSYNC signaling and vertical blanking intervals (VBI) have been incorporated for generating video frames and displaying those video frames when streaming media content between a server and a client. For example, the server strives to generate a game rendered video frame in one or several frame periods as defined by a corresponding server VSYNC signal (e.g. if a frame period of 16.7 ms, then generating a video frame each frame period results in 60 Hz operation, and generating one video frame for each two frame periods results in 30 Hz operation), and subsequently encode and transmit that video frame to the client. At the client, the received encoded video frames are decoded and displayed, wherein the client displays each video frame that is rendered for display beginning with a corresponding client VSYNC.

Figure 1B:
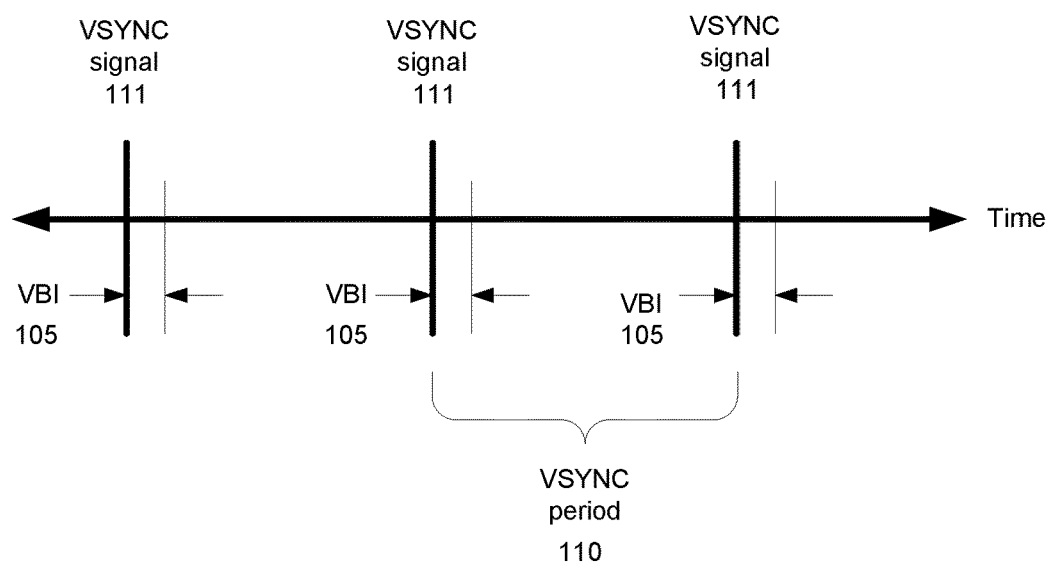
FIG. 1B is a diagram of the frequency of a VSYNC signal, in accordance with one embodiment of the present disclosure.

For illustration, FIG. 1A shows how a VSYNC signal 111 may indicate the beginning of a frame period, wherein various operations may be performed during a corresponding frame period at the server and/or client. When streaming media content, the server may use a server VSYNC signal for generating and encoding video frames, and the client may use a client VSYNC signal for displaying the video frames. The VSYNC signal 111 is generated at a defined frequency which corresponds to the defined frame period 110, as shown in FIG. 1B. In addition, VBI 105 defines the time period between when the last raster line was drawn on the display for a previous frame period and when the first raster line (e.g., top) is drawn to the display. As shown, after VBI 105, the video frame rendered for display is displayed via raster scanlines 106 (e.g., raster line by raster line, from left to right).

In addition, various embodiments of the present disclosure are disclosed for reducing one-way latency and/or latency instability between source and target devices, such as when streaming media content (e.g., video game content). For purposes of illustration only, the various embodiments for reducing one-way latency and/or latency instability are described within a server and client network configuration. However, it is understood that the various techniques disclosed for reducing one-way latency and/or latency instability may be implemented within other network configurations, and/or over peer-to-peer networks, as is shown in FIGS. 2A-2D. For example, the various embodiments disclosed for reducing one-way latency and/or latency instability may be implemented between one or more of server and client devices in various configurations (e.g., server and client, server and server, server and multiple clients, server and multiple servers, client and client, client and multiple clients, etc.).

Figure 2A:
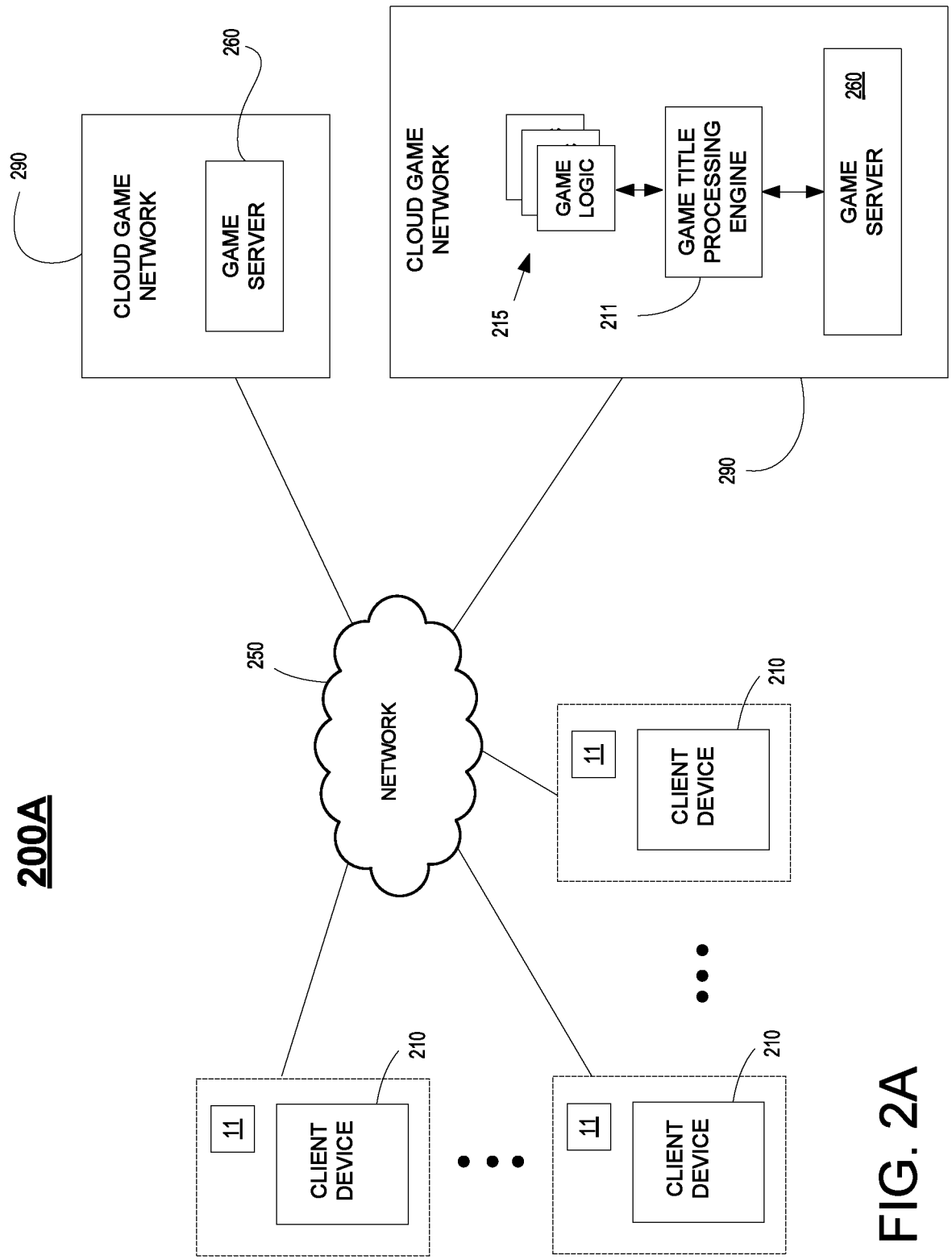
FIG. 2A is a diagram of a system for providing gaming over a network between one or more cloud gaming servers, and one or more client devices, in various configurations, wherein VSYNC signals can be synchronized and offset to reduce one-way latency, in accordance with one embodiment of the present disclosure.

FIG. 2A is a diagram of a system 200A for providing gaming over a network 250 between one or more cloud gaming networks 290 and/or servers 260, and one or more client devices 210, in various configurations, wherein server and client VSYNC signals can be synchronized and offset, and/or wherein dynamic buffering is performed on the client, and/or wherein encode and transmit operations on the server can be overlapped, and/or wherein receive and decode operations at the client can be overlapped, and/or wherein decode and display operations on the client can be overlapped to reduce one-way latency between the server 260 and client 210, in accordance with one embodiment of the present disclosure. In particular, system 200A provides gaming via a cloud game network 290, wherein the game is being executed remote from client device 210 (e.g., thin client) of a corresponding user that is playing the game, in accordance with one embodiment of the present disclosure. System 200A may provide gaming control to one or more users playing one or more games through the cloud game network 290 via network 250 in either single-player or multi-player modes. In some embodiments, the cloud game network 290 may include a plurality of virtual machines (VMs) running on a hypervisor of a host machine, with one or more virtual machines configured to execute a game processor module utilizing the hardware resources available to the hypervisor of the host. Network 250 may include one or more communication technologies. In some embodiments, network 250 may include $5^{th}$ Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the cloud game network 290 includes a game server 260 that provides access to a plurality of video games. Game server 260 may be any type of server computing device available in the cloud, and may be configured as one or more virtual machines executing on one or more hosts. For example, game server 260 may manage a virtual machine supporting a game processor that instantiates an instance of a game for a user. As such, a plurality of game processors of game server 260 associated with a plurality of virtual machines is configured to execute multiple instances of one or more games associated with gameplays of a plurality of users. In that manner, back end server support provides streaming of media (e.g., video, audio, etc.) of gameplays of a plurality of gaming applications to a plurality of corresponding users. That is, game server 260 is configured to stream data (e.g., rendered images and/or frames of a corresponding gameplay) back to a corresponding client device 210 through network 250. In that manner, a computationally complex gaming application may be executing at the back end server in response to controller inputs received and forwarded by client device 210. Each server is able to render images and/or frames that are then encoded (e.g., compressed) and streamed to the corresponding client device for display.

For example, a plurality of users may access cloud game network 290 via communications network 250 using corresponding client devices 210 configured for receiving streaming media. In one embodiment, client device 210 may be configured as a thin client providing interfacing with a back end server (e.g., game server 260 of cloud game network 290) configured for providing computational functionality (e.g., including game title processing engine 211). In another embodiment, client device 210 may be configured with a game title processing engine and game logic for at least some local processing of a video game, and may be further utilized for receiving streaming content as generated by the video game executing at a back end server, or for other content provided by back end server support. For local processing, the game title processing engine includes basic processor based functions for executing a video game and services associated with the video game. The game logic is stored on the local client device 210 and is used for executing the video game.

In particular, client device 210 of a corresponding user (not shown) is configured for requesting access to games over a communications network 250, such as the internet, and for rendering for display images generated by a video game executed by the game server 260, wherein encoded images are delivered to the client device 210 for display in association with the corresponding user. For example, the user may be interacting through client device 210 with an instance of a video game executing on game processor of game server 260. More particularly, an instance of the video game is executed by the game title processing engine 211. Corresponding game logic (e.g., executable code) 215 implementing the video game is stored and accessible through a data store (not shown), and is used to execute the video game. Game title processing engine 211 is able to support a plurality of video games using a plurality of game logics, each of which is selectable by the user.

For example, client device 210 is configured to interact with the game title processing engine 211 in association with the gameplay of a corresponding user, such as through input commands that are used to drive gameplay. In particular, client device 210 may receive input from various types of input devices, such as game controllers, tablet computers, keyboards, gestures captured by video cameras, mice, touch pads, etc. Client device 210 can be any type of computing device having at least a memory and a processor module that is capable of connecting to the game server 260 over network 250. The back-end game title processing engine 211 is configured for generating rendered images, which is delivered over network 250 for display at a corresponding display in association with client device 210. For example, through cloud based services the game rendered images may be delivered by an instance of a corresponding game executing on game executing engine 211 of game server 260. That is, client device 210 is configured for receiving encoded images (e.g., encoded from game rendered images generated through execution of a video game), and for displaying the images that are rendered for display 11. In one embodiment, display 11 includes an HMD (e.g., displaying VR content). In some embodiments, the rendered images may be streamed to a smartphone or tablet, wirelessly or wired, direct from the cloud based services or via the client device 210 (e.g., PlayStation® Remote Play).

In one embodiment, game server 260 and/or the game title processing engine 211 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc.

In one embodiment, cloud game network 290 is a distributed game server system and/or architecture. In particular, a distributed game engine executing game logic is configured as a corresponding instance of a corresponding game. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network 290, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g., video frames, audio, etc.) for the gaming application in response to controller input by a player. The distribution synchronization layer is able to efficiently execute (e.g., through load balancing) those functions across the distributed processing entities, such that critical game engine components/functions are distributed and reassembled for more efficient processing.

The game title processing engine 211 includes a central processing unit (CPU) and graphics processing unit (GPU) group that may be configured to perform multi-tenancy GPU functionality. In another embodiment, multiple GPU devices are combined to perform graphics processing for a single application that is executing on a corresponding CPU.

Figure 2B:
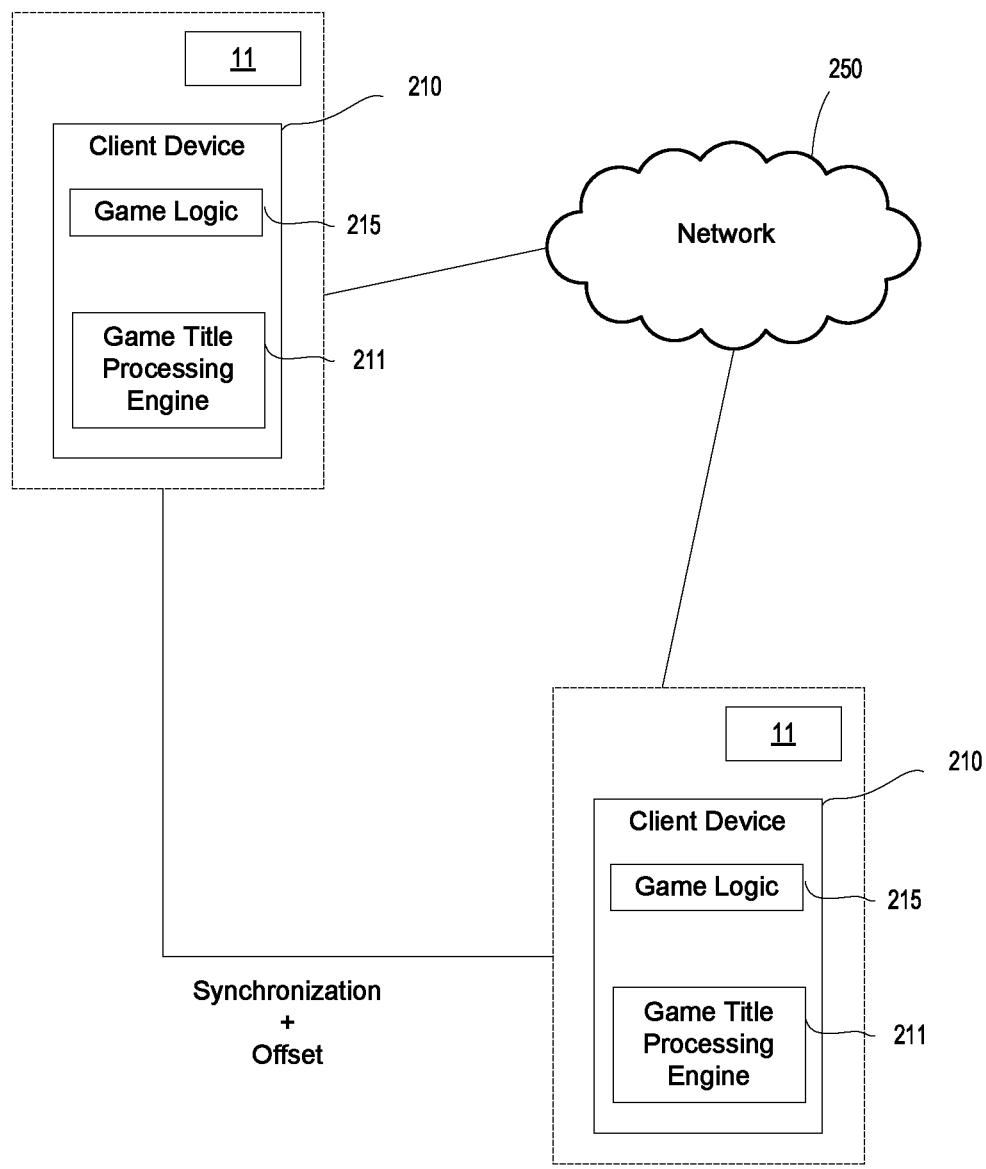
FIG. 2B is a diagram for providing gaming between two or more peer devices, wherein VSYNC signals can be synchronized and offset to achieve optimal timing of receipt of controller and other information between the devices, in accordance with one embodiment of the present disclosure.

FIG. 2B is a diagram for providing gaming between two or more peer devices, wherein VSYNC signals can be synchronized and offset to achieve optimal timing of receipt of controller and other information between the devices, in accordance with one embodiment of the present disclosure. For example, head-to-head gaming may be performed using two or more peer devices that are connected through network 250 or directly through peer-to-peer communication (e.g., Bluetooth, local area networking, etc.).

As shown, a game is being executed locally on each of the client devices 210 (e.g., game console) of corresponding users that are playing the video game, wherein the client devices 210 communicate through peer-to-peer networking. For example, an instance of a video game is executing by the game title processing engine 211 of a corresponding client device 210. Game logic 215 (e.g., executable code) implementing the video game is stored on the corresponding client device 210, and is used to execute the game. For purposes of illustration, game logic 215 may be delivered to the corresponding client device 210 through a portable medium (e.g. optical media) or through a network (e.g., downloaded through the internet from a gaming provider).

In one embodiment, the game title processing engine 211 of a corresponding client device 210 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc.

Client device 210 may receive input from various types of input devices, such as game controllers, tablet computers, keyboards, gestures captured by video cameras, mice, touch pads, etc. Client device 210 can be any type of computing device having at least a memory and a processor module, and is configured for generating rendered images executed by the game title processing engine 211, and for displaying the rendered images on a display (e.g., display 11, or display 11 including a head mounted display—HMD, etc.). For example, the rendered images may be associated with an instance of the game executing locally on client device 210 to implement gameplay of a corresponding user, such as through input commands that are used to drive gameplay. Some examples of client device 210 include a personal computer (PC), a game console, a home theater device, a general purpose computer, mobile computing device, a tablet, a phone, or any other types of computing devices that can execute an instance of a game.

Figure 2C:
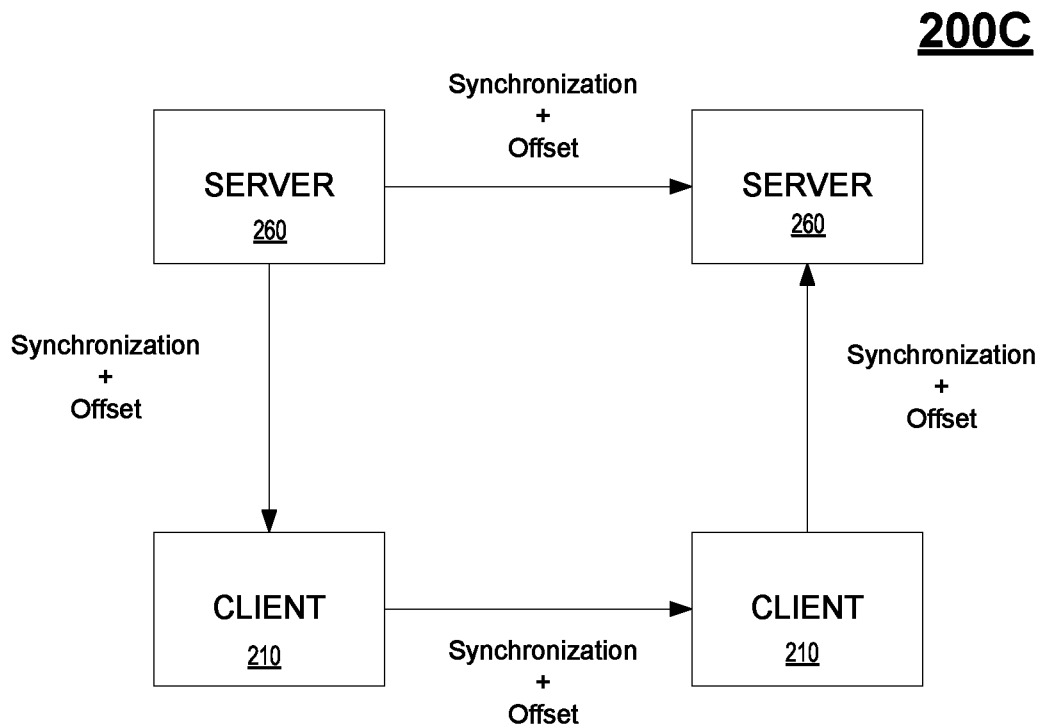
FIG. 2C illustrates various network configurations that benefit from proper synchronization and offsetting of VSYNC signals between a source device and a target device, in accordance with one embodiment of the present disclosure.

FIG. 2C illustrates various network configurations that benefit from proper synchronization and offsetting of VSYNC signals between a source device and a target device, including those configurations shown in FIGS. 2A-2B, in accordance with embodiments of the present disclosure. In particular, the various network configurations benefit from proper alignment of frequencies of server and client VSYNC signals, and a timing offset of the server and client VSYNC signals for purposes of reducing one-way latency and/or latency variability between a server and client. For example, one network device configuration includes a cloud gaming server (e.g., source) to client (target) configuration. In one embodiment, the client may include a WebRTC client configured for providing audio and video communication inside a web browser. Another network configuration includes a client (e.g. source) to server (target) configuration. Still another network configuration includes a server (e.g., source) to server (e.g., target) configuration. Another network device configuration includes a client (e.g., source) to client (target) configuration, wherein the clients can each be a gaming console to provide for head-to-head gaming, for example.

In particular, alignment of VSYNC signals may include synchronizing the frequencies of the server VSYNC signal and the client VSYNC signal, and may also include adjusting a timing offset between the client VSYNC signal and server VSYNC signal, for the purposes of removing drift, and/or to maintain an ideal relationship between server and client VSYNC signals, for purposes of reducing one-way latency and/or latency variability. To achieve proper alignment, the server VSYNC signal may be tuned in order to implement proper alignment between a server 260 and client 210 pair, in one embodiment. In another embodiment, the client VSYNC signal may be tuned in order to implement proper alignment between a server 260 and client 210 pair. Once the client and server VSYNC signals are aligned, the server VSYNC signal and client VSYNC signal occur at substantially the same frequency, and are offset from each other by a timing offset, that may be adjusted from time to time. In another embodiment, alignment of VSYNC signals may include synchronizing the frequencies of VSYNC for two clients, and may also include adjusting a timing offset between their VSYNC signals, for the purposes of removing drift, and/or achieving optimal timing of receipt of controller and other information; either VSYNC signal may be tuned to achieve this alignment. In still another embodiment, alignment may include synchronizing the frequencies of VSYNC for a plurality of servers, and may also include synchronizing the frequencies of the server VSYNC signals and the client VSYNC signals and adjusting a timing offset between the client VSYNC and server VSYNC signals, e.g. for head-to-head cloud gaming. In the server to client configuration and the client to client configuration, alignment may include both synchronization of the frequencies between the server VSYNC signal and client VSYNC signal, as well as providing a proper timing offset between the server VSYNC signal and client VSYNC signal. In the server to server configuration, alignment may include synchronization of the frequencies between the server VSYNC signal and client VSYNC signal without setting a timing offset.

Figure 2D:
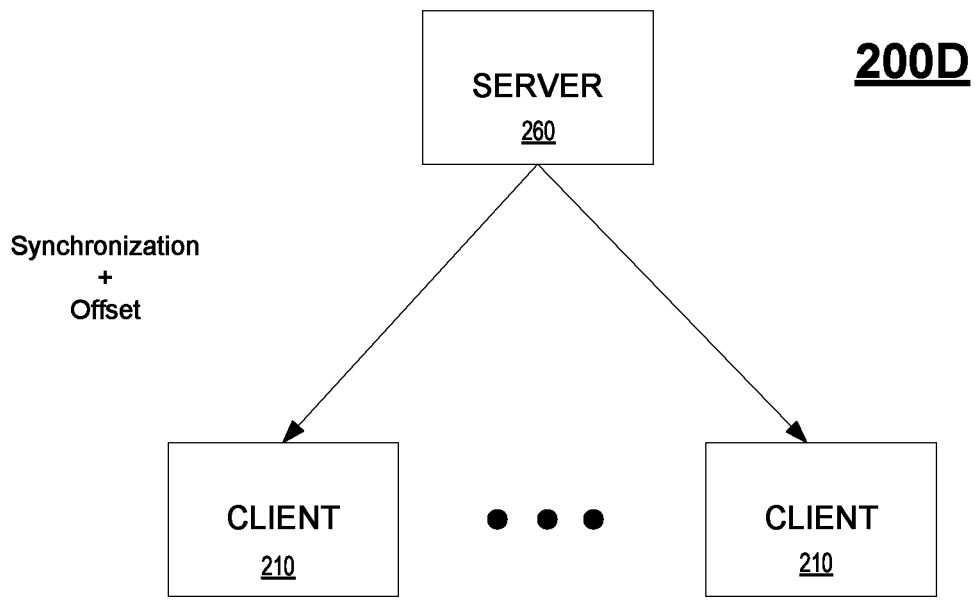
FIG. 2D illustrates a multi-tenancy configuration between a cloud gaming server and multiple clients that benefit from proper synchronization and offsetting of VSYNC signals between a source device and a target device, in accordance with one embodiment of the present disclosure.

FIG. 2D illustrates a multi-tenancy configuration between a cloud gaming server 260 and one or more clients 210 that benefit from proper synchronization and offsetting of VSYNC signals between a source device and a target device, in accordance with one embodiment of the present disclosure. In the server to client configuration, alignment may include both synchronization of the frequencies between the server VSYNC signal and client VSYNC signal, as well as providing a proper timing offset between the server VSYNC signal and client VSYNC signal. In the multi-tenancy configuration, the client VSYNC signal is tuned at each client 210 in order to implement proper alignment between a server 260 and client 210 pair, in one embodiment.

For example, a graphics subsystem may be configured to perform multi-tenancy GPU functionality, wherein one graphics subsystem could be implementing graphics and/or rendering pipelines for multiple games, in one embodiment. That is, the graphics subsystem is shared between multiple games that are being executed. In particular, a game title processing engine may include a CPU and GPU group that is configured to perform multi-tenancy GPU functionality, wherein one CPU and GPU group could be implementing graphics and/or rendering pipelines for multiple games, in one embodiment. That is, the CPU and GPU group is shared between multiple games that are being executed. The CPU and GPU group could be configured as one or more processing devices. In another embodiment, multiple GPU devices are combined to perform graphics processing for a single application that is executing on a corresponding CPU.

Figure 3:
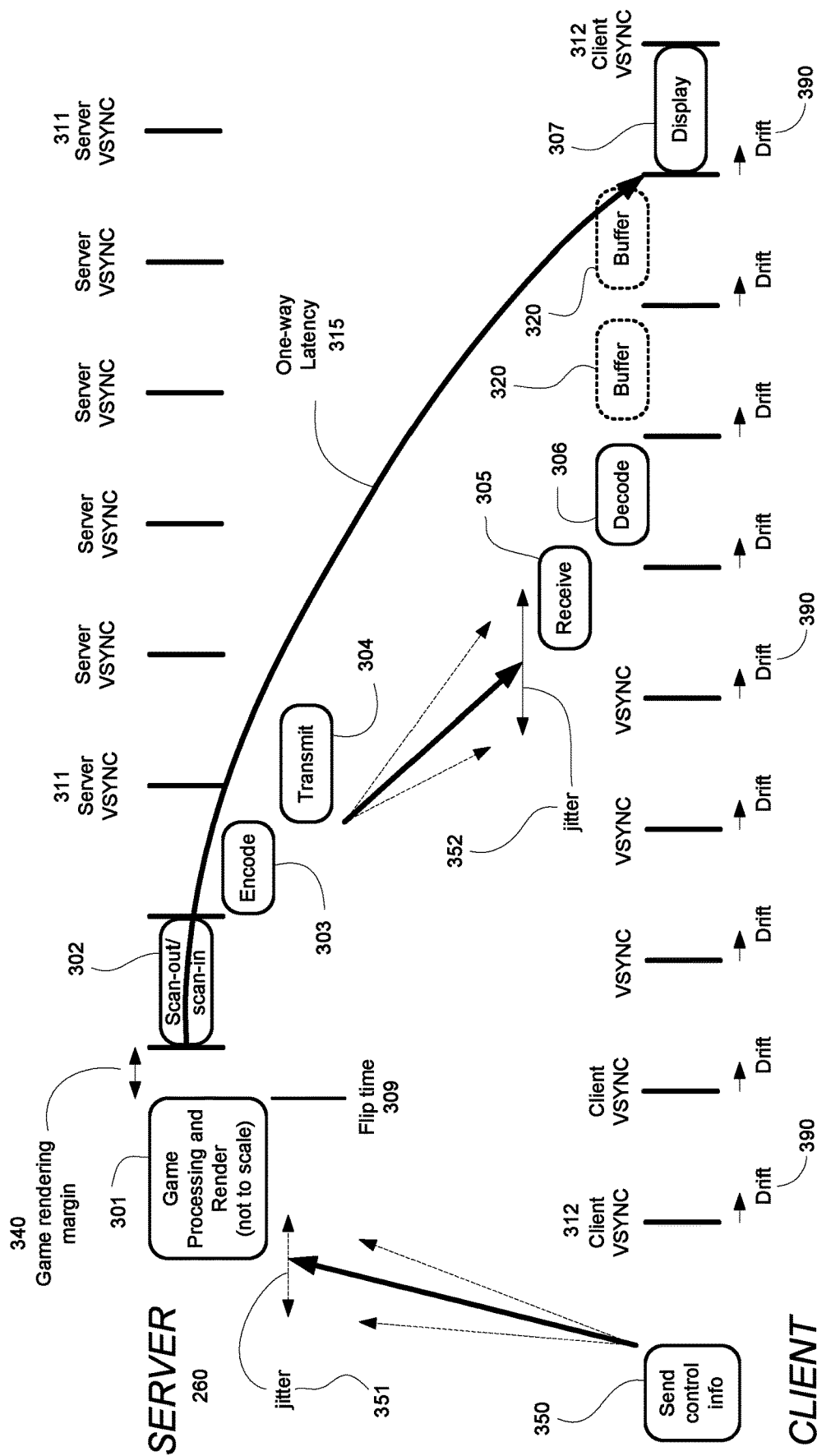
FIG. 3 illustrates the variation in one-way latency between a cloud gaming server and a client due to clock drift when streaming video frames generated from a video game executing on the server, in accordance with one embodiment of the present disclosure.

FIG. 3 illustrates the general process of executing a video game at a server to generate game rendered video frames and sending those video frames to a client for display. Traditionally, a number of the operations at the game server 260 and client 210 are performed within a frame period as defined by a respective VSYNC signal. For example, the server 260 strives to generate a game rendered video frame at 301 in one or multiple frame periods as defined by a corresponding server VSYNC signal 311. The video frame is generated by the game, either in response to control information (e.g., input commands of a user) delivered from an input device at operation 350, or game logic not driven by control information. Transmission jitter 351 may be present when sending control information to the server 260, wherein jitter 351 measures the variation of network latency from client to server (e.g., when sending input commands). As shown, the bold arrow shows the current delay when sending control information to the server 260, but due to jitter there may be a range of arrival times for control information at the server 260 (e.g. range bounded by the dotted arrows). At flip-time 309, the GPU reaches a flip command that indicates that the corresponding video frame has been completely generated and placed into the frame buffer at the server 260. Thereafter, the server 260 performs scan-out/scan-in (operation 302, wherein scan-out may be aligned with the VSYNC signal 311) for that video frame over the subsequent frame period as defined by the server VSYNC signal 311 (the VBI is omitted for clarity). Subsequently the video frame is encoded (operation 303) (e.g. encoding starts after an occurrence of the VSYNC signal 311, and the end of encoding may not be aligned with the VSYNC signal) and transmitted (operation 304, wherein transmission may not be aligned with the VSYNC signal 311) to the client 210. At the client 210, the encoded video frames are received (operation 305, wherein receive may not be aligned with the client VSYNC signal 312), decoded (operation 306, wherein decode may not be aligned with the client VSYNC signal 312), buffered, and displayed (operation 307, wherein the start of display may be aligned with the client VSYNC signal 312). In particular, the client 210 displays each video frame that is rendered for display beginning with a corresponding occurrence of the client VSYNC signal 312.

One-way latency 315 may be defined as being the latency from beginning of transfer of the video frame to the encoding unit (e.g. scan-out 302) at the server, to the beginning of display of the video frame at the client 307. That is, one-way latency is the time from server scan-out to client display, taking into account client buffering. Individual frames have a latency from beginning of scan-out 302 to completion of decode 306 that may vary from frame to frame due to the high degree of variance of server operations such as encode 303 and transmission 304, network transmission between the server 260 and client 210 with accompanying jitter 352, and client reception 305. Transmission jitter 352 measures the variation in one-way latency from the server 260 to the client 210, wherein a lower jitter value exhibits a more stable connection. Variation in latency may be due to operations at the server that exceed a frame period, as well as networking issues that introduce latency when transmitting video frames to the client 210. As shown, the straight bold arrow shows the current latency when sending the corresponding video frame to the client 210, but due to jitter 352 there may be a range of arrival times for video frames at the client 210 (e.g. range bounded by the dotted arrows). As one-way latency must be relatively stable (e.g. kept fairly consistent) to achieve a good play experience, traditionally buffering 320 is performed with the result that the display of individual frames with low latency (e.g. from beginning of scan-out 302 to completion of decode 306) is delayed for several frame periods. That is, if there are network instabilities, or unpredictable encode/decode time, extra buffering is needed so that one-way latency is kept consistent.

One-way latency between a cloud gaming server and a client may vary, in part, due to clock drift when streaming video frames generated from a video game executing on the server, in accordance with one embodiment of the present disclosure. That is, differences in the frequencies of the server VSYNC signal 311 and the client VSYNC signal 312 may cause the client VSYNC signal to drift 390 relative to the frames arriving from the server 260. The drift 390 between the relative timing of the server VSYNC signal 311 and the client VSYNC signal 312 may be due to very slight differences in the crystal oscillators used in each of the respective clocks at the server and client. The variation in latency may be extended through the receiving and decoding operations at the client 210, wherein one or more buffers 320 may be implemented to address the variation in one-way latency. Furthermore, one-way latency may be reduced by performing one or more of synchronization and offset of VSYNC signals for alignment between a server and a client, by providing dynamic buffering on the client, by overlapping encode and transmit of video frames at the server, by overlapping receive and decode of video frames at the client, and by overlapping decoding and displaying of video frames at the client In addition, during encoding (operation 303) of video frames, in previous technologies the encoder determines how much change there is between a current video frame being encoded, and one or more previously encoded frames to determine whether there is a scene change (e.g., complex image for the corresponding generated video frame). That is, a scene change hint may be inferred from the difference between the current frame to be encoded and previous frames that have already been encoded. When streaming content from a server to client over a network, the encoder at the server may decide to encode a video frame that is detected as a scene change with complexity. Otherwise, the encoder will encode a video frame that is not detected as a scene change with less complexity. However, detection of a scene change at the encoder may take up to one frame period (e.g., adding jitter), as the video frame is initially encoded with less complexity (in a first frame period), but then is re-encoded (in a second frame period) with more complexity once it is determined that there is a scene change. Also, the detection of a scene change may be triggered unnecessarily (such as through minor explosions in the image), as the difference between the currently encoded video frame and a previously encoded video frame may exceed a threshold difference value, even though there is no scene change. As such, when a scene change is detected at the encoder, additional latency due to jitter is introduced at the encoder to accommodate for performing scene change detection and re-encoding the video frame with more complexity.

Figure 4:
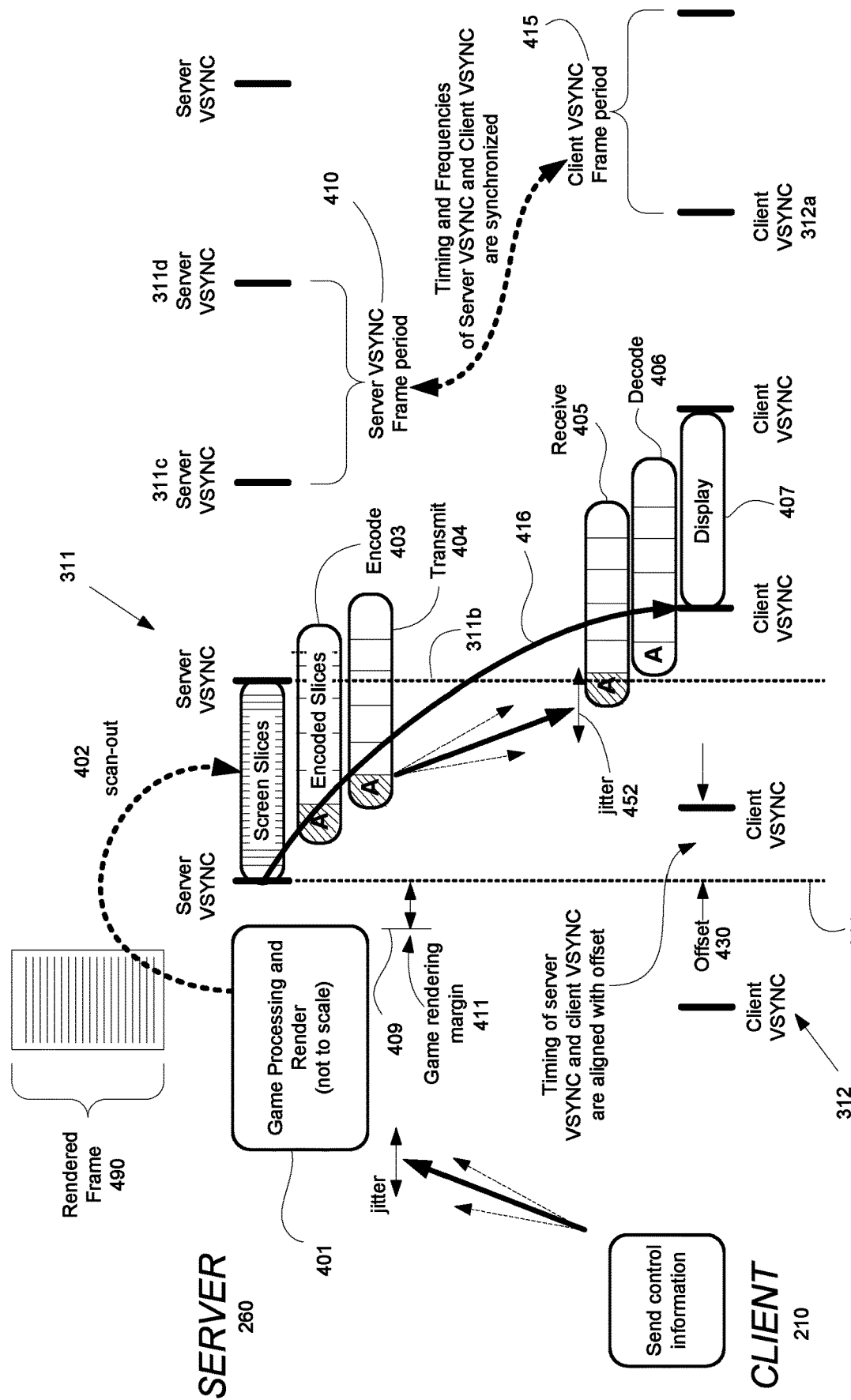
FIG. 4 illustrates a network configuration including a cloud gaming server and a client when streaming video frames generated from a video game executing on the server, the VSYNC signals between the server and the client being synchronized and offset to allow for overlapping of operations at the server and client, and to reduce one-way latency between the server and the client.

FIG. 4 illustrates the flow of data through a network configuration including a highly optimized cloud gaming server 260 and a highly optimized client 210 when streaming video frames generated from a video game executing on the server, wherein overlapping server operations and client operations reduces the one-way latency, and synchronizing and offsetting the VSYNC signals between the server and the client reduces the one-way latency as well as reduces variability in the one-way latency between the server and the client, in accordance with embodiments of the present disclosure. In particular, FIG. 4 shows the desired alignment between the server and the client VSYNC signals. In one embodiment, tuning of the server VSYNC signal 311 is performed to obtain proper alignment between server and client VSYNC signals, such as in a server and client network configuration. In another embodiment, tuning of the client VSYNC signal 312 is performed to obtain proper alignment between server and client VSYNC signals, such as in a multi-tenant server to multiple clients network configuration. For purposes of illustration, tuning of the server VSYNC signal 311 is described in FIG. 4 for purposes of synchronizing the frequencies of server and client VSYNC signals, and/or adjusting the timing offset between corresponding client and server VSYNC signals, though it is understood that the client VSYNC signal 312 may also be used for tuning. In the context of this patent, "synchronize" should be taken to mean tuning the signals so that their frequencies match, but phase may differ; "offset" should be taken to mean the time delay between the signals, e.g. the time between when one signal reaches its maximum and the other signal reaches its maximum.

As shown, FIG. 4 illustrates an improved process of executing a video game at a server to generate rendered video frames and sending those video frames to a client for display, in embodiments of the present disclosure. The process is shown with respect to generation and display of a single video frame at a server and client. In particular, the server generates a game rendered video frame at 401. For example, the server 260 includes a CPU (e.g., game title processing engine 211) configured for executing the game. The CPU generates one or more draw calls for a video frame, wherein the draw calls include commands placed into a command buffer for execution by a corresponding GPU of the server 260 in a graphics pipeline. The graphics pipeline may include one or more shader programs on vertices of objects within a scene to generate texture values as rendered for the video frame for displaying, wherein the operations are performed in parallel through a GPU for efficiency. At flip-time 409, the GPU reaches a flip command in the command buffer that indicates that the corresponding video frame has been completely generated and/or rendered and placed into the frame buffer at the server 260.

At 402, the server performs scan-out of the game rendered video frame to an encoder. In particular, scan-out is performed scanline by scanline, or in groups of consecutive scanlines, wherein a scanline refers to a single horizontal line, for example of a display from screen edge to screen edge. These scanlines or groups of consecutive scanlines are sometimes referred to as slices, and are referred to in this specification as screen slices. In particular, scan-out 402 may include a number of processes that modify the game rendered frame, including overlaying it with another frame buffer, or shrinking it in order to surround it with information from another frame buffer. During scan-out 402, the modified video frame is then scanned into an encoder for compression. In one embodiment, scan-out 402 is performed at an occurrence 311a of the VSYNC signal 311. In other embodiments, scan-out 402 may be performed before the occurrence of the VSYNC signal 311, such as at flip-time 409.

At 403, the game rendered video frame (which may have undergone modification) is encoded on an encoder slice by encoder slice basis at the encoder to generate one or more encoded slices, wherein an encoded slice is unrelated to a scanline or screen slice. As such, the encoder generates one or more encoded (e.g., compressed) slices. In one embodiment, the encoding process begins before the scan-out 402 process has fully completed for a corresponding video frame. Further, the start and/or end of encode 403 may or may not be aligned with the server VSYNC signal 311. The boundaries of an encoded slice are not restricted to a single scanline, and may be comprised of a single scanline, or multiple scanlines. Additionally, the end of an encoded slice and/or the start of the next encoder slice may not necessarily occur at the edges of the display screen (e.g., may occur somewhere mid-screen or in the middle of a scanline), such that the encoded slice need not traverse fully from edge to edge of the display screen. As shown, one or more encoded slices may be compressed and/or encoded, including "encoded slice A" that is compressed having hash marks.

At 404, the encoded video frame is transmitted from the server to the client, wherein the transmission may occur on an encoded slice-by-slice basis, wherein each encoded slice is an encoder slice that has been compressed. In one embodiment, the transmission process 404 begins before the encoding process 403 has fully completed for a corresponding video frame. Further, the start and/or end of transmission 404 may or may not be aligned with the server VSYNC signal 311. As shown, encoded slice A that is compressed is transmitted to the client independently of the other compressed encoder slices for the rendered video frame. The encoder slices may be transmitted one at a time, or in parallel.

At 405, the client receives the compressed video frame, again on an encoded slice-by-slice basis. Further, the start and/or end of receive 405 may or may not be aligned with the client VSYNC signal 312. As shown, encoded Slice A that is compressed is received by the client. Transmission jitter 452 may be present between the server 260 and client 210, wherein jitter 452 measures the variation in network latency from the server 260 to the client 210. A lower jitter value exhibits a more stable connection. As shown, the bold straight arrow shows the current latency when sending the corresponding video frame to the client 210, but due to jitter there may be a range of arrival times for video frames at the client 210 (e.g. range bounded by the dotted arrows). Variation in latency may also be due to one or more operations at the server such as encode 403 and transmission 404, as well as networking issues that introduce latency when transmitting video frames to the client 210.

At 406, the client decodes the compressed video frame, again on an encoded slice-by-slice basis, producing decoded Slice A (shown without hash marks) that is now ready for display. In one embodiment, the decode process 406 begins before the receive process 405 has fully completed for a corresponding video frame. Further, the start and/or end of decode 406 may or may not be aligned with the client VSYNC signal 312. At 407, the client displays the decoded rendered video frame on the display at the client. That is, the decoded video frame is placed in a display buffer which is streamed out on a scanline-by-scanline basis to a display device, for example. In one embodiment, the display process 407 (i.e. the streaming out to the display device) begins after the decode process 406 has fully completed for a corresponding video frame, i.e. the decoded video frame is fully resident in the display buffer. In another embodiment, the display process 407 begins before the decode process 406 has fully completed for a corresponding video frame. That is, streamout to the display device begins from the address of the display buffer at a time at which only a portion of the decoded frame buffer is resident in the display buffer. The display buffer is then updated or filled in with remaining portions of the corresponding video frame in time for displaying, such that the updating of the display buffer is performed prior to streamout of those portions to the display. Further, the start and/or end of display 407 is aligned with the client VSYNC signal 312.

In one embodiment, the one-way latency 416 between the server 260 and the client 210 may be defined as the elapsed time between when scan-out 402 begins and when display 407 begins. Embodiments of the present disclosure are capable of aligning the VSYNC signals (e.g. synchronize the frequency and adjust the offset) between the server and the client, to reduce one-way latency between the server and the client, and to reduce variability in the one-way latency between the server and the client. For example, embodiments of the present disclosure are able to calculate an optimal adjustment to the offset 430 between server VSYNC signal 311 and client VSYNC signal 312 such that even in the event of near worst case time needed for server processing such as encode 403 and transmit 404, near worst case network latency between server 260 and client 210, and near worst case client processing such as receive 405 and decode 406, the decoded rendered video frame is available in time for the display process 407. That is, it is not necessary to determine the absolute offset between server VSYNC and client VSYNC; it is sufficient to adjust the offset so that the decoded rendered video frame is available in time for the display process.

In particular, the frequencies of the server VSYNC signal 311 and the client VSYNC signal 312 may be aligned through synchronization. Synchronization is achieved through tuning the server VSYNC signal 311 or the client VSYNC signal 312. For purposes of illustration, tuning is described in relation to the server VSYNC signal 311, though it is understood that tuning could be performed on the client VSYNC signal 312 instead. For example, as shown in FIG. 4 the server frame period 410 (e.g., the time between two occurrences 311c and 311d of the server VSYNC signal 311) is substantially equal to the client frame period 415 (e.g., the time between two occurrences 312a and 312b of the client VSYNC signal 312), which indicates that the frequencies of the server VSYNC signal 311 and client VSYNC signal 312 are also substantially equal.

To maintain synchronization of the frequencies of the server and client VSYNC signals, the timing of the server VSYNC signal 311 may be manipulated. For example, the vertical blanking interval (VBI) in the server VSYNC signal 311 may be increased or reduced over a period of time, such as to account for the drift between the server VSYNC signal 311 and the client VSYNC signal 312. Manipulation of vertical blanking (VBLANK) lines in the VBI provides for adjusting the number of scanlines used for VBLANK for one or more frame periods of the server VSYNC signal 311. Dropping the number of scanlines of VBLANK reduces a corresponding frame period (e.g., time interval) between two occurrences of the server VSYNC signal 311. Conversely, increasing the number of scanlines of VBLANK increases a corresponding frame period (e.g., time interval) between two occurrences of the VSYNC signal 311. In that manner, the frequency of the server VSYNC signal 311 is adjusted to align the frequencies between the client and server VSYNC signals 311 and 312 to be at substantially the same frequency. Also, offset between server and client VSYNC signals can be adjusted by increasing or reducing the VBI for a short period of time, before returning the VBI to its original value. In one embodiment, the server VBI is adjusted. In another embodiment, the client VBI is adjusted. In yet another embodiment, instead of two devices (server and client), there are a plurality of connected devices, each of which may have a corresponding VBI that is adjusted. In one embodiment, each of the plurality of connected devices may be independent peer devices (e.g. without a server device). In another embodiment, the plurality of devices may include one or more server devices and/or one or more client devices arranged in one or more server/client architectures, multi-tenant server/client(s) architecture, or some combination thereof.

Alternatively, the pixel clock of the server (e.g., located at the southbridge of a northbridge/southbridge core logic chipset of the server) may be manipulated to perform coarse and/or fine tuning of the frequency of the server VSYNC signal 311 over a period of time to bring the synchronization of frequencies between server and client VSYNC signals 311 and 312 back into alignment, in one embodiment. Specifically, the pixel clock in the south bridge of the server may be overclocked or underclocked to adjust the overall frequency of the VSYNC signal 311 of the server. In that manner, the frequency of the server VSYNC signal 311 is adjusted to align the frequencies between the client and server VSYNC signals 311 and 312 to be at substantially the same frequency. Offset between server and client VSYNC can be adjusted by increasing or reducing the client server pixel clock for a short period of time, before returning the pixel clock to its original value. In one embodiment, the server pixel clock is adjusted. In another embodiment, the client pixel clock is adjusted. In yet another embodiment, instead of two devices (server and client), there are a plurality of connected devices, each of which may have a corresponding pixel clock which is adjusted. In one embodiment, each of the plurality of connected devices may be independent peer devices (e.g. without a server device). In another embodiment, the plurality of connected devices may include one or more server devices and one or more client devices arranged in one or more server/client architectures, multi-tenant server/client(s) architecture, or some combination thereof.

Figure 5A:
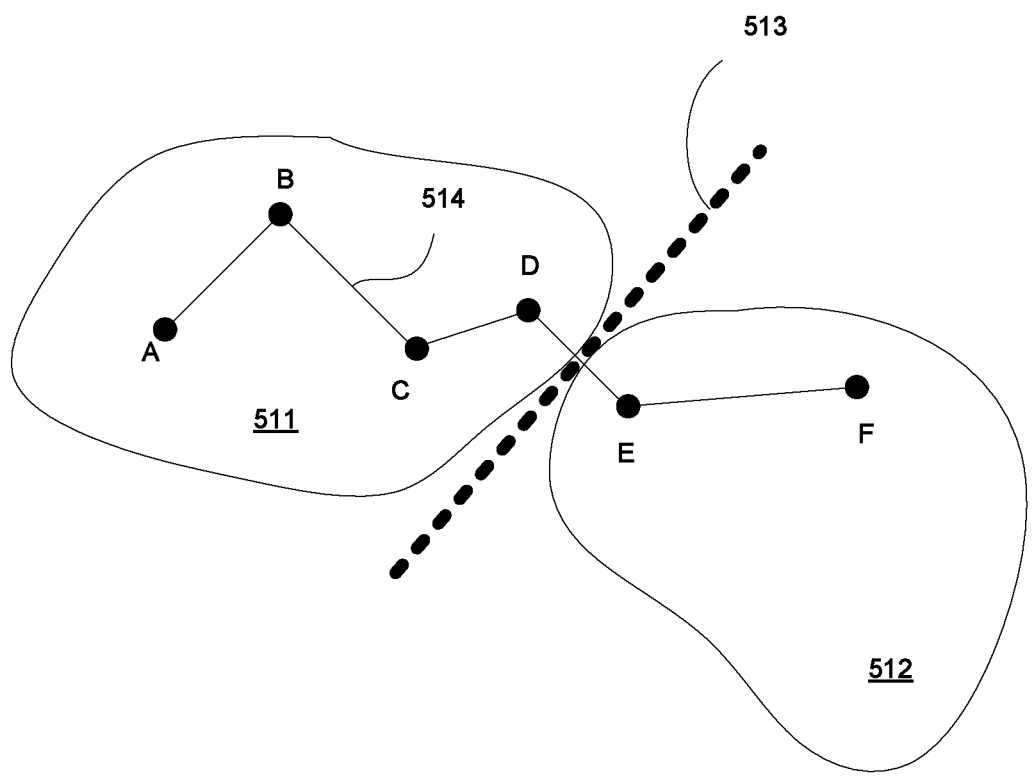
FIG. 5A illustrates a cloud gaming server system configured for using a scene change hint when encoding a video frame when streaming content from a video game executing on a cloud gaming server across a network to a client, in accordance with one embodiment of the present disclosure.

FIG. 5A illustrates a transition between two scenes of a video game that is executing on a cloud gaming server, in accordance with one embodiment of the present disclosure. In particular, a scene may be a portion of a virtualized environment for a video game, wherein the virtualized environment may have many scenes. For example, a scene may be described as a cave environment within which a character being played by a user is engaged in a boss battle. A particular scene may be rendered from different viewpoints. For example, as the character is moving around the scene of the cave environment, different images are generated from different points in the cave. Generally, movement within a scene is not considered a scene change as the variability between viewpoints of a scene may not vary much.

As shown, there are two scenes 511 and 512 in the virtualized environment for a corresponding video game being played by a user. For purposes of illustration, scene 511 may be the cave environment in the example provided above. The cave environment may be characterized using dark and monotone coloring. Scene 512 may be outside of the cave environment, such as being a brightly lit beach scene having a blue sky, blue ocean, and a white sandy beach. A character being played by a user may be traversing along a path 514 in the virtualized environment, wherein the path 514 traverses across both scenes 511 and 512. For example, the character moves from point A to point B, then to point B to point C, and then from point C to point D in scene 511. Because the viewpoints of the character along path 514 within scene 511 do not vary much, the corresponding video frames being generated may be encoded with less complexity, such as generating a low percentage of I-frames and a high percentage of P-frames, such as those used in MPEG or H.264 compression formats.

The path 514 of the character moves from point D in scene 511 to point E in scene 512. That is, the path between points D and E includes a scene change 513, when the character moves from scene 511 inside the cave environment to scene 512 into the beach environment. Scene change 513 indicates a transition of scenes being displayed, which generally indicates a new scene with new assets must be drawn during exaction of the video game. For example, scene change 513 may be a scene-cut within a game, wherein the game transitions from one scene to another between two video frames (e.g. a scene change in a cinematic sequence, or start of interactive gameplay after a series of menus). That is, with a scene change, the corresponding video frame or video frames representing the transition between scene 511 and scene 512 may be generated with high complexity (e.g., as reference frames), such as generated as I-frames, such as those used in the MPEG or H.264 compression formats.

After the scene change 513, the character continues along path 514 and moves from point E to point F within scene 512. Again because the viewpoints of the character along path 514 within scene 512 do not vary much, the corresponding video frames being generated (e.g., between point E and Point F) may be encoded with less complexity, such as generating a low percentage of I-frames and a high percentage of P-frames.

Figure 5B:
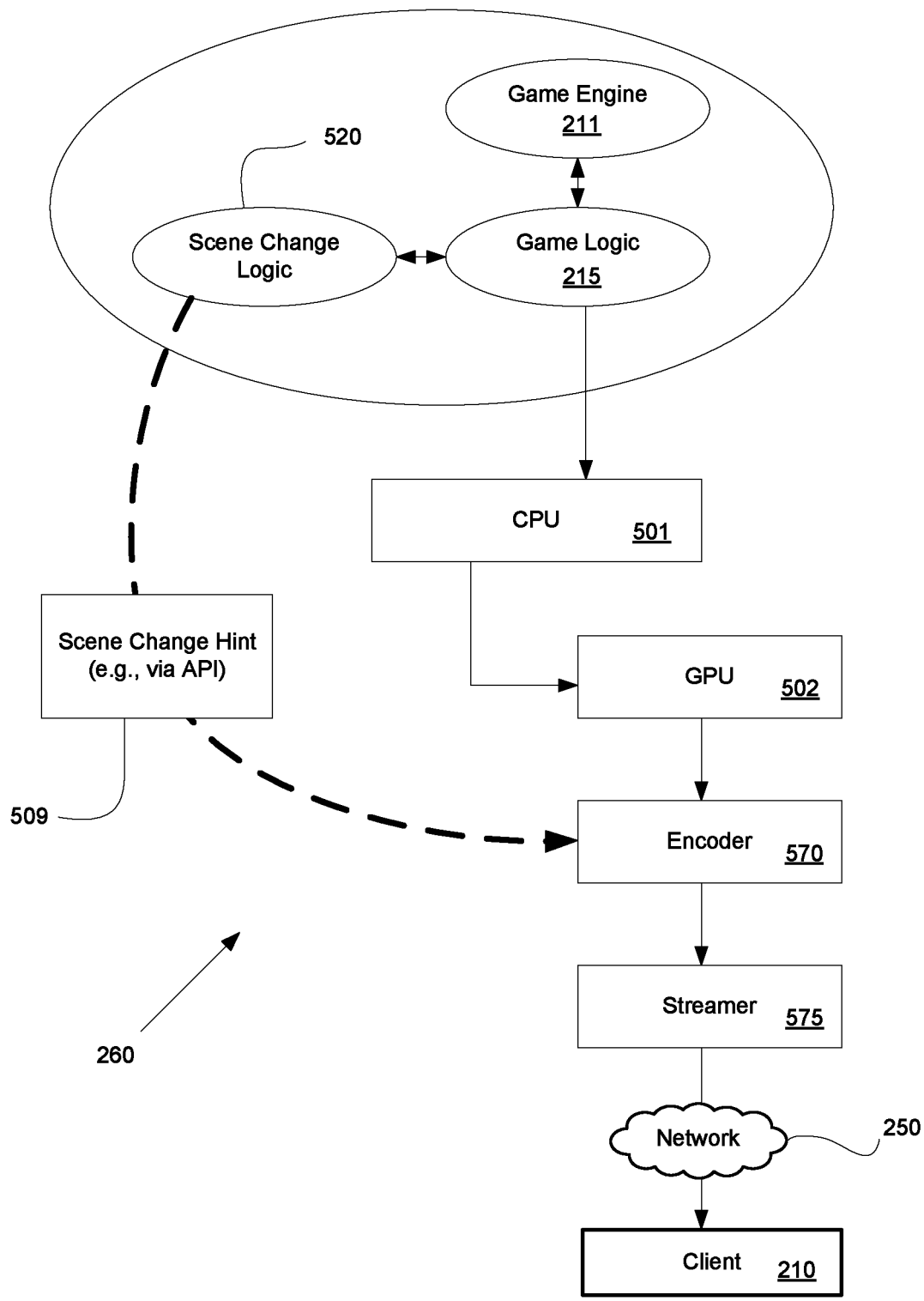
FIG. 5B illustrates scan-out operations being performed to generate modified video frames for delivery to an encoder when streaming content from a video game executing at a cloud gaming server across a network to a client, wherein the encoder is configured for using a scene change hint when encoding a corresponding video frame, in accordance with one embodiment of the present disclosure.

FIG. 5B illustrates a cloud gaming system including a cloud gaming server 260 and client 210. The cloud gaming server 260 is configured for generating and using a scene change hint when encoding a video frame when streaming content from a video game executing on a cloud gaming server 260 across a network 250 to the client 210, in accordance with one embodiment of the present disclosure.

In particular, game logic 215 of a video is built upon game engine 211, which when executed by the cloud gaming server 260 generates game rendered video frames for streaming back to a client 210. In particular, the game engine 211 includes core functionality that may be used by the game logic to build a gaming environment of the video game. For example, some functionalities of a game engine 211 may include a physics engine for simulating physical forces and collisions acting on objects in the video game, a rendering engine for 2D or 3D graphics, collision detection, sound, animation, artificial intelligence, networking, streaming, etc. In that manner, the game logic 215 does not have to build from scratch the core functionalities provided by the game engine 211. In addition, the core functionalities of the game engine 211 may be ported to and used by other game logic for other video games.

The game logic 215 in combination with the game engine 211 is executed by CPU 501 and GPU 502 (e.g., configured to implement a graphics pipeline), wherein the CPU 501 and GPU 502 may be configured as a rendering pipeline for generating game rendered video frames. The rendering pipeline includes CPU 501 and GPU 502 and memory that may be accessible to both (e.g., system memory, shared memory, vertex buffers, index buffers, depth or Z buffers, frame buffers for storing rendered video frames, etc.). The rendering pipeline outputs game rendered images as image frames that are suitable for display, and includes corresponding color information for each of the pixels in a virtualized display.

The CPU 501 is configured for executing the video game (e.g., game logic built over the game engine 211) to generate a plurality of video frames. For example, CPU 501 generates a draw call for a frame of the video frames, the draw call including commands stored in a corresponding command buffer that are executed by the GPU in a GPU pipeline. For a particular video frame, there may be multiple draw calls that are generated by the CPU 501 and executed by the GPU 502 through a graphics pipeline. Subsequent video frames are generated and/or rendered for display using similarly configured command buffers, wherein the video frames are output from the GPU pipeline.

In particular, commands in one or more command buffers may be executed by the GPU 502 to generate a corresponding video frame. For example, a graphics pipeline may be implemented by the GPU 502 to perform shader programs on vertices of objects within a scene to generate texture values for pixels of a display, wherein the operations are performed in parallel through a GPU 502 for efficiency. In general, the graphics pipeline receives input geometries (e.g., vertices of objects within a gaming world). A vertex shader builds the polygons or primitives that make up the objects within a scene. The vertex shader or other shader programs may perform lighting, shading, shadowing and other operations for the polygons. Depth or z-buffering may be performed to determine which objects are visible in a scene that is rendered from a corresponding viewpoint. Rasterization is performed to project objects in the three-dimensional world to a two-dimensional plane defined by the viewpoint. Pixel sized fragments are generated for the objects, wherein one or more fragments may contribute to the color of a corresponding pixel when displaying the image. The fragments are merged and/or blended to determine a combined color of each of the pixels in a corresponding video frame, and can be stored in a frame buffer.

In one embodiment, each of the game rendered video frames may be composited and blended with additional user interface (UX) features (e.g., as overlays). Exemplary UX features may include user interfaces, system user interfaces, texting, messaging, menus, communications, additional gaming viewpoints, eSports information, etc. For example, a scan-out process may be implemented to composite and blend each of the game rendered video frames with corresponding feature overlays to generate modified video frames. Additional operations may be performed when generating the modified video frames, such as decompressing DCC compressed surface, resolution scaling to the target display, color space conversion, degamma, HDR expansion, gamut remap, LUT shaping, tone mapping, blending gamma, blending, etc. As such, the one or more layers of the input frame buffers that are composited and blended and modified using other operations, is then optionally placed into a display buffer, and then scanned to an encoder (e.g., scanned from the display buffer).

A plurality of game rendered video frames and/or modified video frames for the video game is generated. The modified video frames are then scanned to encoder 570 for compression before streaming the modified video frames to a client over a network. For example, a corresponding modified video frame may be compressed into one or more encoded slices (encoder slices that are compressed), which may be further packetized for network streaming. In one embodiment, a corresponding modified video frame is encoded on an encoder slice-by-slice basis to generate one or more encoded slices for a corresponding modified video frame. The modified video frames that have been compressed and/or packetized into encoded slices are then optionally stored into a buffer (e.g., first-in-first-out or FIFO buffer). Streamer 575 is configured to transmit the encoded slices from the optional buffer over the network 250 to the client 210. Streamer 575 may be configured to operate at the application layer of a transmission control protocol/internet protocol (TCP/IP) computer networking model.

The game logic 215 can be made aware of scene changes while the CPU is executing a video game, in accordance with one embodiment of the present disclosure. In particular, the scene change logic 520 may be integrated within game logic 215 and/or provided as an add-on to game logic 215. Scene change logic 520 is configured to determine, anticipate, and/or predict when a video frame that is being generated includes a scene change (e.g., a transition from one scene to another scene. For example, the game logic 215 and/or scene change logic 520 may include code that indicates that a particular video frame is a scene change. In another embodiment, the scene change logic 520 is configured to track game play during execution of the video game to predict when a scene change is imminent.

In particular, the scene change logic 520 analyzes game state data collected during execution of the video game to determine, and/or anticipate, and/or predict when there is a scene change that is coming in the next X number of frames, or for an identified video frame. For example, game state data defines the state of the game at that point, and may include game characters, game objects, game object attributes, game attributes, game object state, graphic overlays, location of a character within a gaming world of the game play of the player, the scene or gaming environment of the game play, the level of the gaming application, the assets of the character (e.g., weapons, tools, bombs, etc.), loadout, skills set of the character, game level, character attributes, character location, number of lives left, the total possible number of lives available, armor, trophy, time counter values, and other asset information, etc. In that manner, game state data allows for the generation of the gaming environment that existed at the corresponding point in the video game. As such, the scene change logic 520 when executed is configured to anticipate when a scene change is occurring, and is further configured to identify which video frame (e.g., by frame number) includes the scene change, or over which range of video frames is the scene change likely to occur.

In particular, scene change awareness by the scene change logic 520 and/or the game logic 215 provides for notification of a scene change to an encoder that is used for streaming content from a video game executing on the cloud gaming server across a network to a client device, in one embodiment. For example, the notification may be provided as a scene change hint 509 from the scene change logic 520 to other components (e.g., encoder) via an API, wherein the API may be used to communicate between components or between applications running on the components of the cloud gaming server 260. In one embodiment, the API may be a GPU API. For example, the API may be running on or called by the scene change logic 520 and/or the game logic 215 to communicate with another component, such as the GPU 502, system memory, command buffers, encoder 570, etc. In one embodiment, the scene change hint 509 may be provided as a data control packet formatted in such a manner that all components receiving the data control packet is able to understand what type of information is included in the data control packet, and understands the proper referencing to the corresponding rendered video frame. In one implementation, the communications protocol used for the API, the formatting for the data control packets or message may be defined in the corresponding software development kit (SDK) for the video game.

Figure 6A:
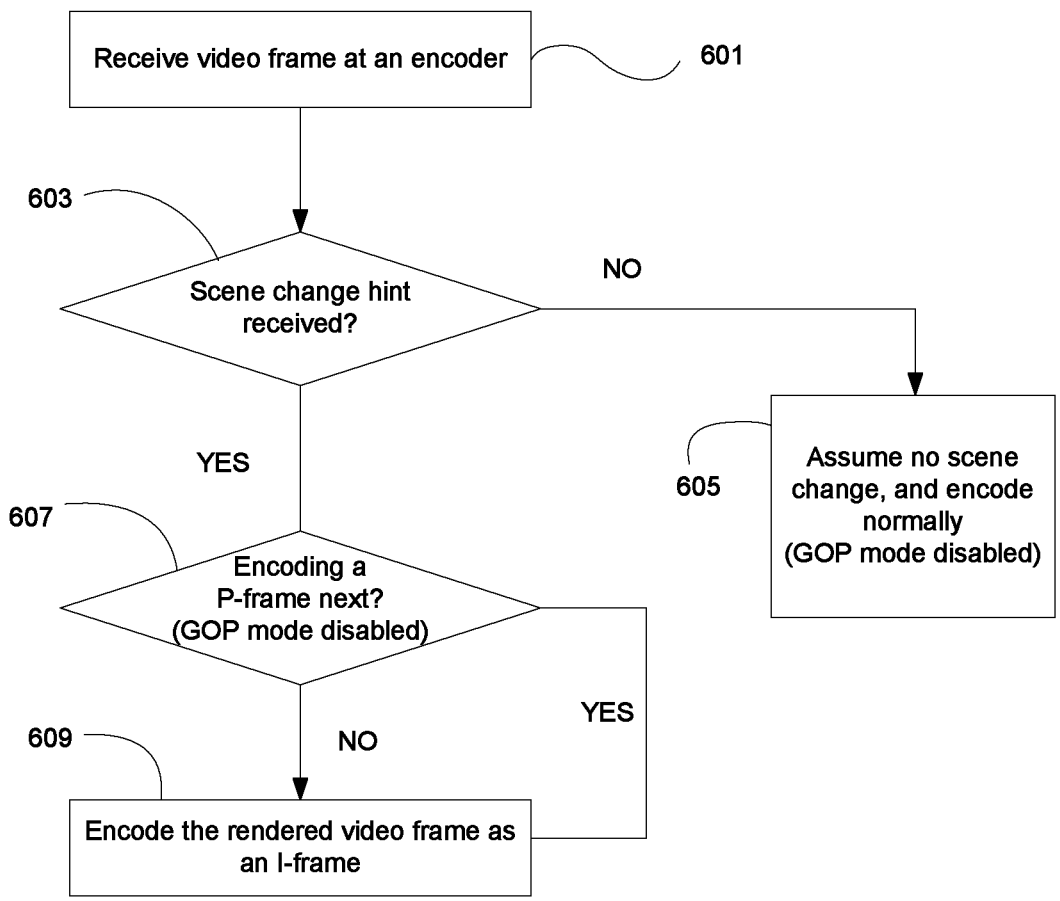
FIG. 6A is a flow diagram illustrating a method for encoding video frames when performing cloud gaming, wherein one or more scene change hints are used by an encoder to process corresponding video frames, in accordance with one embodiment of the present disclosure.

With the detailed description of the various client devices 210 and/or the cloud gaming network 290 (e.g., in the game server 260) of FIGS. 2A-2D, flow diagram 600A of FIG. 6A illustrates a method for encoding video frames when performing cloud gaming wherein one or more scene change hints are used by an encoder to process corresponding video frames, in accordance with one embodiment of the present disclosure. The encoder may choose to encode video frames differently depending on whether a scene change hint was received. In that manner, one-way latency between the cloud gaming server and a client is reduced because the encoder no longer has to determine whether a video frame to be encoded is a scene change. Also, because a frame period is no longer used to determine a scene change and to re-encode a video frame that has been determined to be a scene change, one-way latency is made more consistent as encoding of most video frames is performed over a single frame period. Further, jitter is reduced because a frame period is no longer used to determine a scene change and to re-encode a video frame that has been determined to be a scene change, thereby improving smoothness of client display of video. Although flow diagram 600A is described as providing a scene change hint to an encoder that is configured to compress video frames, it is understood that the scene change hint may also be used by an encoder that is configured to compress encoded slices of a corresponding video frame.

In particular, at 601, a video frame that has been generated by a video game being executed on a CPU and GPU is received at an encoder when streaming content from a cloud gaming server to a client. As previously described, the game generated video frame may be composited and blended with additional user interface features into a modified video frame that is scanned into the encoder.

The encoder is configured to compress the modified video frame based on a desired format. For example, motion pictures experts group (MPEG) or the H.264 standards may be used for streaming media content from a cloud gaming server to a client. The encoder may perform compression by video frames (e.g., MPEG-2), or may perform compression by encoding slices of video frames, wherein each video frame may be compressed as one or more encoded slices. Generally, a video frame may be compressed as an I-frame (Inter-frame) or a P-frame (Predicted-frame), each of which can be partitioned into encoded slices.

In particular, an I-frame contains an entire image, and may be encoded without any reference to any other video frames. That is, the I-frame may stand alone as a key image, and may be used as references for encoding and/or decoding other video frames. An I-frame may also be decoded without reference to any other frames. A video frame that is determined to be a scene change is typically encoded as an I-frame. However, the I-frame typically requires more bits to encode than other frame types, such as the P-frame.

The P-frame is encoded and/or decoded with reference to one or more prior video frames. In general, a video frame encoded as a P-frame contains only differences between the currently encoded frame and one or more previous video frames are provided. That is, redundant information between video frames is not encoded in the P-frame. When decoding, the redundant information may be recovered because the decoded P-frame is referenced to previously decoded video frames that contain the redundant information.

When streaming, video frames are encoded as P-frames until there is a scene change or when the currently encoded frame no longer may reference a key frame (e.g., the previous I-frame), such that the next video frame is then encoded as another I-frame, in one embodiment. In particular, the group of pictures (GOP) mode may be disabled, wherein GOP mode requires one I-frame for every period of video frames (e.g., 16 video frames), in embodiments. In addition, scene change detection may also be disabled at the encoder, in embodiments. By disabling GOP mode and scene change detection, most video frames are encoded as P-frames until it is no longer feasible to generate a P-frame (e.g., cannot reference a previous I-frame). In present embodiments, a video frame is compressed as an I-frame when a corresponding scene change hint is received at the encoder.

At decision step 603, the encoder determines whether a scene change hint has been received for the corresponding video frame. As previously described, the scene change hint may be provided by the video game executing on the cloud gaming server (e.g., generated by the scene change logic 520 and delivered over an API). The encoder behaves differently depending on whether or not a scene change hint was received in connection with a current video frame to be encoded. In particular, when no scene change hint is received, the encoder assumes that the video frame is not a scene change, and encodes the video frame normally. In one embodiment, GOP mode is disabled and scene change detection is also disabled as the encoder relies on the scene change hint to determine when a video frame is a scene change and needs to be encoded as an I-frame. Typically, the encoder would compress the corresponding video frame as a P-frame, unless it is no longer feasible to do so.

On the other hand, when a scene change hint is received, the corresponding video frame is ultimately compressed as an I-frame. In particular, at 607, the method determines whether the next video frame is encoded as a P-frame (i.e., still may be referenced back to the previous I-frame). If the video frame is to be encoded as a P-frame, then at 609 after a scene change hint is received, the corresponding video frame received by the encoder is compressed as an I-frame. On the other hand, if the video frame is to be encoded as an I-frame, the video frame is still encoded as an I-frame. Because the encoder relies on the scene change hint, there is no need for GOP mode or scene change detection at the encoder. In particular, the scene change hint is provided by the CPU when executing the video game to generate the video frame. That is, the video game is aware of when a video frame is considered to be a scene change. For example, code in the video game may be used to identify scene changes, such that corresponding video frames may also be identified as scene changes when generated.

Figure 6B:
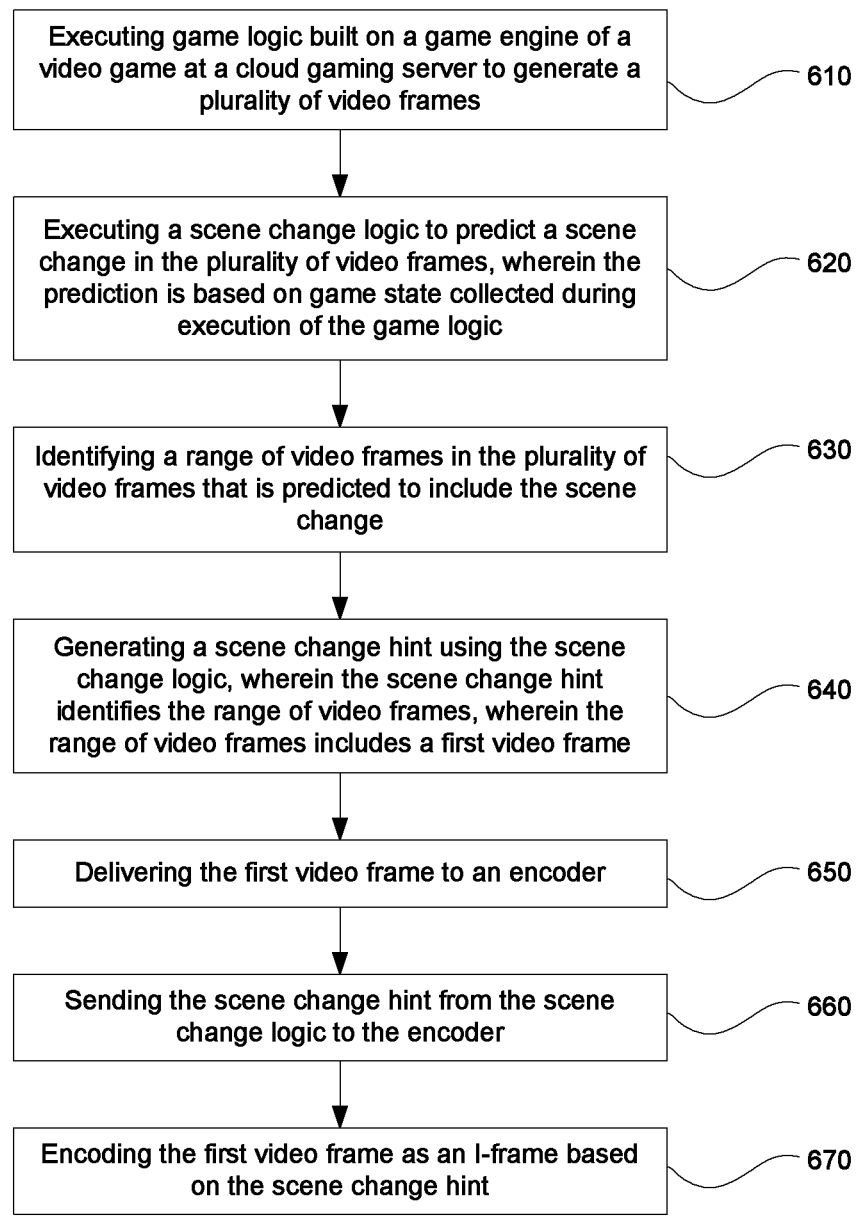
FIG. 6B is a flow diagram illustrating a method for encoding video frames when performing cloud gaming, including the generation of one or more scene change hints when executing a video game or game application that can be used for efficient encoding of corresponding video frames, in accordance with one embodiment of the present disclosure.

With the detailed description of the various client devices 210 and/or the cloud gaming network 290 (e.g., in the game server 260) of FIGS. 2A-2D, flow diagram 600B of FIG. 6B illustrates a method for encoding video frames when performing cloud gaming, including the generation of one or more scene change hints when executing a video game or game application that can be used for efficient encoding of corresponding video frames, in accordance with one embodiment of the present disclosure. Generally, the video game being executed by the cloud gaming server may be configured to provide a hint as to a coming scene change in the next video frame to be encoded, wherein a scene change hint may be communicated to the encoder by the application (e.g., game logic) as it is executed through an API. The encoder may choose to perform different encoding (e.g., switch to I-frame from a P-frame on a scene change). This process provides for smoother frame rates and more reliable latency, such that one-way latency between the cloud gaming server and a client is reduced and made more consistent, thereby improving smoothness of client display of video. Although flow diagram 600B is described as providing a scene change hint to an encoder that is configured to compress video frames, it is understood that the scene change hint may also be used by an encoder that is configured to compress encoded slices of a corresponding video frame.

At 610, the method includes executing game logic built on a game engine of a video game at a cloud gaming server to generate a plurality of video frames. The game logic is executed on a CPU and GPU implementing a graphics pipeline. For example, the cloud gaming server may be executing a video game in a streaming mode, such that the game logic built on the game engine is executed responsive to input commands from a user in order to generate game rendered video frames using the graphics pipeline that can be used for streaming. In particular, a CPU executing the game logic, that is built on the game engine, in cooperation with a GPU graphics pipeline are configured to generate the plurality of video frames. In cloud gaming, the game generated video frames are typically rendered for display on a virtual display.

At 620, the method includes executing scene change logic to predict a scene change in the plurality of video frames, wherein the prediction is based on game state collected during execution of the game logic. The scene change logic may be integrated within the game logic in one embodiment. In another embodiment, the scene change logic may be provided as an add-on to the game logic. In particular, as the game logic is being executed, the scene change logic may identify certain video frames or scenarios in the game as represented by corresponding video frames as being a scene change. The scene change logic is configured to predict a scene change based on tracking of game state collected when generating the plurality of video frames. For example, the scene change logic can predict when a scene change is about to occur, such as when a character is moving from one scene to another scene in a virtualized gaming environment, or when a character has ended a level and is transitioning to another level in the video game, etc. A scene change may be represented by a video frame that includes large and complex scenes of a virtualized gaming world or environment. For example, the scene change may occur when the video game as executed transitions from one scene to another between two video frames (e.g. a scene change or scene cut in a cinematic sequence, or start of interactive gameplay after a series of menus). As such, the video game (e.g., game logic) is able to determine or anticipate when a scene change is about to occur and as video frames are being generated.

At 630, the method includes identifying a range of video frames in the plurality of video frames that is predicted to include the scene change. That is, the scene change logic is executed to predict the likelihood of a scene change over a range of upcoming video frames, or within an identifiable video frame. In one embodiment, the scene change logic is able to predict a scene change for an identifiable video frame, such as a first video frame. In that case, the range of video frames is limited to the first video frame.

At 640, the method includes generating a scene change hint using the scene change logic. In particular, the scene change hint identifies the range of video frames, wherein the range of video frames includes a first video frame. Scene change prediction by the scene change logic enables notification of the scene change to other components of the cloud gaming server that are performing operations on one or more corresponding video frames.

At 650, the method includes delivering the first video frame to an encoder, wherein the first video frame is within the range of video frames identified as having a scene change. The first video frame is scanned into the encoder for compression in preparation of streaming the first video frame to a client, such as when streaming content from a video game executing at the cloud gaming server across a network to the client.

At 660, the method includes sending the scene change hint (e.g., notification) from the CPU to the encoder. Scene change awareness by the scene change logic and/or the game logic provides for downstream notification that an identified video frame or one or more of a range of video frames includes a scene change, thereby allowing downstream components to act accordingly in an effort to reduce processing times as the one or more identified video frames are processed through the cloud gaming server. For example, the scene change hint may be delivered from the scene change logic to the encoder via an API, wherein the API may be used to communicate between components or between applications running on the components of the cloud gaming server.

At 670, the method includes encoding the corresponding video frame (e.g., first video frame) received by the encoder as an I-frame based on the scene change hint, wherein the encoder is configured for compressing video frames for purposes of streaming content from a video game executing on the cloud gaming server across a network to a client device. As previously described, the encoder behaves differently depending on whether or not a video frame is identified as a scene change through receipt of a scene change hint. That is, the encoder is configured to determine if any scene change hint was received at the encoder for the video frame. In particular, when a scene change hint is received, the encoder compresses the corresponding video frame as an I-frame (e.g., key frame).

Normally, when streaming content from a cloud gaming server, video frames are compressed as P-frames until it is no longer feasible to compress a video frame as a P-frame (e.g., unable to reference a previously I-frame or key frame), and unless instructed otherwise through a scene change hint, in accordance with one embodiment of the present disclosure. Because GOP mode is disabled and scene detection is also disabled, the encoder relies heavily on the scene change hint to identify video frames as scene changes, in accordance with one embodiment of the present disclosure. That is, when no scene change hint is received, the encoder assumes that the video frame is not a scene change, and encodes the video frame normally (e.g., as a P-frame). On the other hand, when the scene change hint is received, the corresponding video frame encoded as an I-frame whether or not the video frame is to be encoded normally as a P-frame or an I-frame. As such, when a scene change hint is received for a corresponding video frame, then the encoder compresses that video frame as an I-frame.

In embodiments, a scene change hint supplements encoder compression determination. In particular, the game provides scene change hints and the encoder may be configured with a predetermined or dynamically determined threshold (e.g., high threshold) that are both used to determine whether a video frame is to be encoded as an I-frame or a P-frame. In one scenario, a game may not be providing a scene change hint for a video frame showing an explosion (e.g., during a camera cut), and is not recommending encoding the video frame as an I-frame, but it may be more efficient to encode the frame as an I-frame as determined by the encoder. Specifically, the encoder is also determining whether the explosion is large enough to merit compression as an I-frame. That is, the encoder determines there is a scene change (e.g., explosion) in a corresponding range of video frames that meets or exceeds a threshold independent of any detection of a scene change by the scene change logic. For example, the encoder determines that the delta between frames was large enough that a scene change is warranted. As such, the corresponding video frame is encoded as an I-frame based on either a scene change hint, or the determination by the encoder that the scene change meets or exceeds the threshold. In another scenario, the game may be providing a scene change hint for a video frame (e.g., showing an explosion during a camera cut), and thus is recommending encoding the video frame as an I-frame, but it may be more efficient to encode the frame as a P-frame as determined by the encoder. Specifically, the encoder is also determining whether the explosion is large enough to merit compression as an I-frame. That is, the encoder determines that the scene change identified by the scene change logic in a corresponding range of video frames does not meet or exceed a threshold. For example, the encoder determines that the delta between frames was below the threshold thereby indicating that compression as a P-frame would be more efficient. As such, there may be a termination of the encoding of the corresponding video frame as an I-frame, and the encoding of the corresponding video frame as a P-frame.

Figure 7:
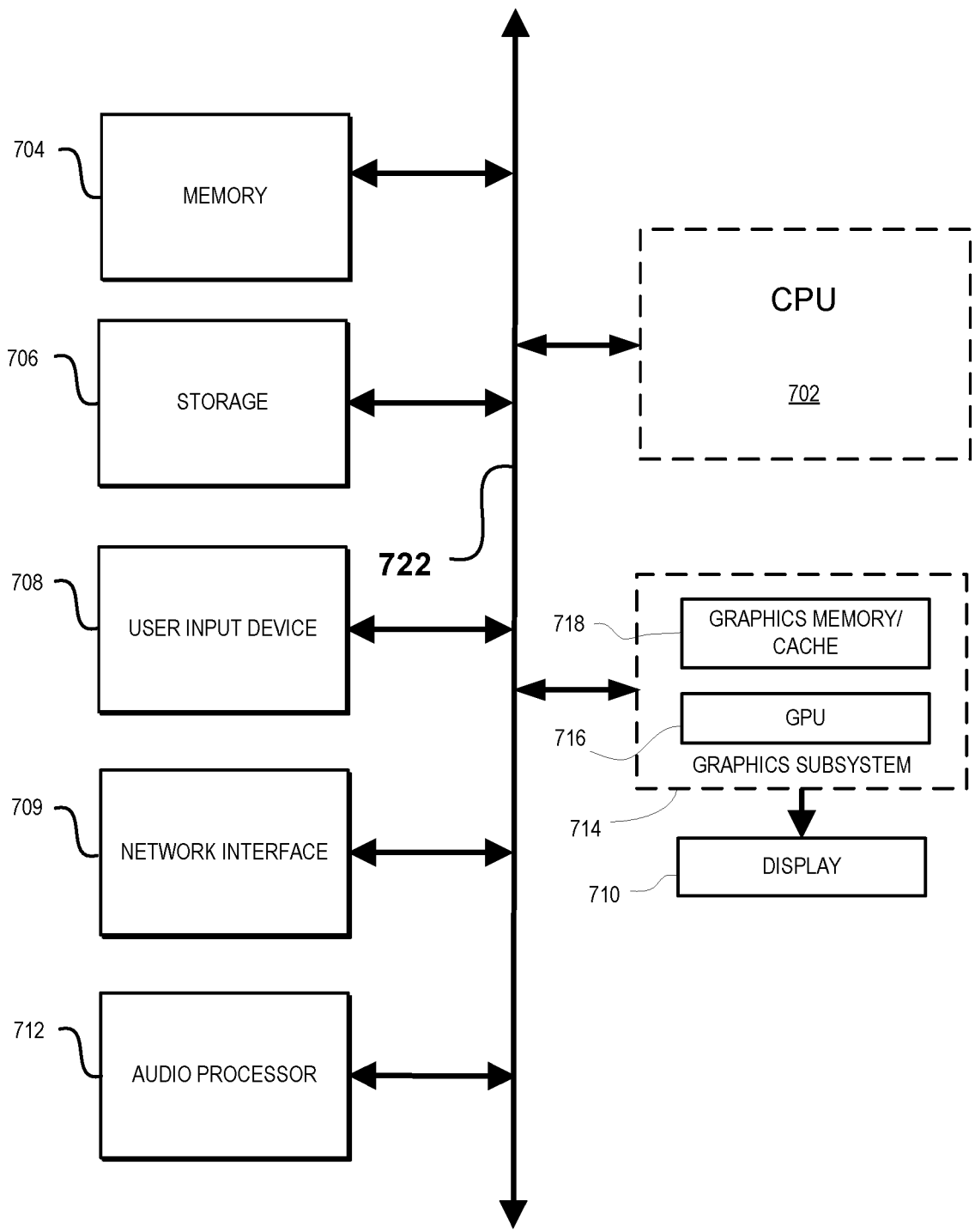
FIG. 7 illustrates components of an example device that can be used to perform aspects of the various embodiments of the present disclosure.

FIG. 7 illustrates components of an example device 700 that can be used to perform aspects of the various embodiments of the present disclosure. For example, FIG. 7 illustrates an exemplary hardware system suitable for streaming media content and/or receiving streamed media content, including providing to an encoder a scene change hint for a video frame generated during execution of a video game for purposes of reducing latency and providing more consistent latency between the cloud gaming server and a client, and for improving smoothness of client display of video, in accordance with embodiments of the present disclosure. This block diagram illustrates a device 700 that can incorporate or can be a personal computer, a server computer, gaming console, mobile device, or other digital device, each of which is suitable for practicing an embodiment of the invention. Device 700 includes a central processing unit (CPU) 702 for running software applications and optionally an operating system. CPU 702 may be comprised of one or more homogeneous or heterogeneous processing cores.

In accordance with various embodiments, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 704 stores applications and data for use by the CPU 702 and GPU 716. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, and/or microphones. Network interface 709 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, graphics subsystem including GPU 716, memory 704, data storage 706, user input devices 708, network interface 709, and audio processor 712 are connected via one or more data buses 722.

A graphics subsystem 714 is further connected with data bus 722 and the components of the device 700. The graphics subsystem 714 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710, or to be projected by a projection system (not shown). Display device 710 can be any device capable of displaying visual information in response to a signal from the device 700, including CRT, LCD, plasma, and OLED displays. Device 700 can provide the display device 710 with an analog or digital signal, for example.

Other embodiments for optimizing the graphics subsystem 714 could include multi-tenancy GPU operations where a GPU instance is shared between multiple applications, and distributed GPUs supporting a single game. The graphics subsystem 714 could be configured as one or more processing devices.

For example, the graphics subsystem 714 may be configured to perform multi-tenancy GPU functionality, wherein one graphics subsystem could be implementing graphics and/or rendering pipelines for multiple games, in one embodiment. That is, the graphics subsystem 714 is shared between multiple games that are being executed.

In other embodiments, the graphics subsystem 714 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for streaming media content and/or receiving streamed media content, including providing to an encoder a scene change hint for a video frame generated during execution of a video game for purposes of reducing latency and providing more consistent latency between the cloud gaming server and a client, and for improving smoothness of client display of video.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities.

Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for encoding, comprising:
executing game logic built on a game engine of a video game at a cloud gaming server to generate a plurality of video frames, wherein the game logic is executed in response to controller input of a user to control a game play of the video game;
collecting game state from one or more video frames that have been generated during execution of the game logic;
executing a scene change logic to predict a scene change occurring within a range of upcoming video frames in the plurality of video frames, wherein prediction of the scene change is based on the game state collected during execution of the game logic, wherein the scene change logic executes independently from the game logic;
identifying using the scene change logic a video frame from the range of video frames, wherein the video frame is predicted by the scene change logic to include the scene change;
generating a scene change hint using the scene change logic, wherein the scene change hint identifies the video frame;
generating the video frame during execution of the game logic and delivering the video frame to an encoder;
sending the scene change hint from the scene change logic to the encoder and receiving the scene change hint at the encoder before the video frame is compressed by the encoder; and
encoding the video frame as an I-frame based on the scene change hint.

2. The method of claim 1, further comprising:
receiving the video frame at the encoder;
determining if any scene change hint was received at the encoder for the video frame;
encoding the video frame normally when no scene change hint was received; and
encoding the video frame as the I-frame after determining that the scene change hint was received.

3. The method of claim 1, further comprising:
determining at the encoder that the scene change in the video frame meets or exceeds a threshold independent of any detection by the scene change logic; and
encoding the video frame as the I-frame based on the scene change hint or determination of the encoder that the scene change meets or exceeds the threshold,
wherein the threshold reflects a difference between the video frame and a previous video frame.

4. The method of claim 1, further comprising:
determining at the encoder that the scene change in the video frame does not meet or exceed a threshold; and
terminating the encoding of the video frame as the I-frame; and
encoding the video frame normally,
wherein the threshold reflects a difference between the video frame and a previous video frame.

5. The method of claim 1,
wherein the scene change logic is integrated into the game logic or provided as an add-on to the game logic,
wherein the scene change logic is configured to predict the scene change based on tracking of the game state collected when generating the plurality of video frames.

6. The method of claim 1, further comprising:
disabling group of pictures (GOP) mode at the encoder; and
disabling scene change detection at the encoder.

7. The method of claim 1, further comprising:
predicting the scene change in the video frame,
wherein the range of upcoming video frames is limited to the video frame.

8. The method of claim 1,
wherein the scene change is predicted before the video frame is generated.

9. A non-transitory computer-readable medium storing a computer program for encoding, the computer-readable medium comprising:
program instructions for executing game logic built on a game engine of a video game at a cloud gaming server to generate a plurality of video frames, wherein the game logic is executed in response to controller input of a user to control a game play of the video game;
program instructions for collecting game state from one or more video frames that have been generated during execution of the game logic;
program instructions for executing a scene change logic to predict a scene change occurring within a range of upcoming video frames in the plurality of video frames, wherein prediction of the scene change is based on game state collected during execution of the game logic, wherein the scene change logic executes independently from the game logic;
program instructions for identifying using the scene change logic a video frame from the range of video frames, wherein the video frame is predicted by the scene change logic to include the scene change;
program instructions for generating a scene change hint using the scene change logic, wherein the scene change hint identifies the video frame;
program instructions for generating the video frame during execution of the game logic and delivering the video frame to an encoder;
program instructions for sending the scene change hint from the scene change logic to the encoder and receiving the scene change hint at the encoder before the video frame is compressed by the encoder; and
program instructions for encoding the video frame as an I-frame based on the scene change hint.

10. The non-transitory computer-readable medium of claim 9, further comprising:
program instructions for receiving the video frame at the encoder;
program instructions for determining if any scene change hint was received at the encoder for the video frame;
program instructions for encoding the video frame normally when no scene change hint was received; and
program instructions for encoding the video frame as the I-frame after determining that the scene change hint was received.

11. The non-transitory computer-readable medium of claim 9, further comprising:
program instructions for determining at the encoder that the scene change in the video frame meets or exceeds a threshold independent of any detection by the scene change logic; and
program instructions for encoding the video frame as the I-frame based on the scene change hint or the determination of the encoder that the scene change meets or exceeds the threshold,
wherein the threshold reflects a difference between the video frame and a previous video frame.

12. The non-transitory computer-readable medium of claim 9, further comprising:
program instructions for determining at the encoder that the scene change in the video frame does not meet or exceed a threshold; and
program instructions for terminating the encoding of the video frame as the I-frame; and
program instructions for encoding the video frame normally,
wherein the threshold reflects a difference between the video frame and a previous video frame.

13. The non-transitory computer-readable medium of claim 9,
wherein the scene change logic is integrated into the game logic or provided as an add-on to the game logic,
wherein the scene change logic is configured to predict the scene change based on tracking of the game state collected when generating the plurality of video frames.

14. The non-transitory computer-readable medium of claim 9, further comprising:
program instructions for disabling group of pictures (GOP) mode at the encoder; and
program instructions for disabling scene change detection at the encoder.

15. The non-transitory computer-readable medium of claim 9, further comprising:
program instructions for predicting the scene change in the video frame,
wherein the range of upcoming video frames is limited to the first video frame.

16. The non-transitory computer-readable medium of claim 9,
wherein the scene change is predicted before the video frame is generated.

17. A computer system comprising:
a processor; and
memory coupled to the processor and having stored therein instructions that, if executed by the computer system, cause the computer system to execute a method for encoding comprising:
executing game logic built on a game engine of a video game at a cloud gaming server to generate a plurality of video frames, wherein the game logic is executed in response to controller input of a user to control a game play of the video game;
collecting game state from one or more video frames that have been generated during execution of the game logic;
executing a scene change logic to predict a scene change occurring within a range of upcoming video frames in the plurality of video frames, wherein prediction of the scene change is based on game state collected during execution of the game logic, wherein the scene change logic executes independently from the game logic;
identifying using the scene change logic a video frame from the range of video frames, wherein the video frame is predicted by the scene change logic to include the scene change;
generating a scene change hint using the scene change logic, wherein the scene change hint identifies the video frame;
generating the video frame during execution of the game logic and delivering the video frame to an encoder;
sending the scene change hint from the scene change logic to the encoder and receiving the scene change hint at the encoder before the video frame is compressed by the encoder; and
encoding the video frame as an I-frame based on the scene change hint.

18. The computer system of claim 17, the method further comprising:
receiving the video frame at the encoder;
determining if any scene change hint was received at the encoder for the video frame;
encoding the video frame normally when no scene change hint was received; and
encoding the video frame as the I-frame after determining that the scene change hint was received.

19. The computer system of claim 17, the method further comprising:
determining at the encoder that the scene change in the video frame meets or exceeds a threshold independent of any detection by the scene change logic; and
encoding the video frame as the I-frame based on the scene change hint or the determination of the encoder that the scene change meets or exceeds the threshold,
wherein the threshold reflects a difference between the video frame and a previous video frame.

20. The computer system of claim 17, the method further comprising:
   determining at the encoder that the scene change in the video frame does not meet or exceed a threshold; and
   terminating the encoding of the video frame as the I-frame; and
   encoding the video frame normally,
   wherein the threshold reflects a difference between the video frame and a previous video frame.

21. The computer system of claim 17,
   wherein in the method the scene change logic is integrated into the game logic or provided as an add-on to the game logic,
   wherein the scene change logic is configured to predict the scene change based on tracking of the game state collected when generating the plurality of video frames.

22. The computer system of claim 17, the method further comprising:
   disabling group of pictures (GOP) mode at the encoder; and
   disabling scene change detection at the encoder.

23. The computer system of claim 17, the method further comprising:
   predicting the scene change in the video frame,
   wherein the range of upcoming video frames is limited to the video frame.

* * * * *